United States Patent
Ucar et al.

(10) Patent No.: US 12,065,159 B2
(45) Date of Patent: Aug. 20, 2024

(54) CUSTOMIZABLE ABNORMAL DRIVING DETECTION

(71) Applicant: TOYOTA MOTOR ENGINEERING & MANUFACTURING NORTH AMERICA, INC., Plano, TX (US)

(72) Inventors: Seyhan Ucar, Mountain View, CA (US); Emrah Akin Sisbot, Mountain View, CA (US); Tomohiro Matsuda, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 17/967,813

(22) Filed: Oct. 17, 2022

(65) Prior Publication Data
US 2024/0124008 A1    Apr. 18, 2024

(51) Int. Cl.
*B60W 50/14*    (2020.01)
*B60W 40/08*    (2012.01)

(52) U.S. Cl.
CPC ............ *B60W 50/14* (2013.01); *B60W 40/08* (2013.01); *B60W 2050/143* (2013.01); *B60W 2050/146* (2013.01); *B60W 2554/4046* (2020.02)

(58) Field of Classification Search
CPC ................. B60W 50/14; B60W 40/08; B60W 2050/143; B60W 2050/146; B60W 2554/4046
See application file for complete search history.

(56) References Cited

U.S. PATENT DOCUMENTS

| 11,072,342 B2 | 7/2021 | Kong |
| 11,634,125 B2 * | 4/2023 | Yata .................. B60W 30/0956 701/23 |

(Continued)

FOREIGN PATENT DOCUMENTS

| CN | 112896188 A | 6/2021 |
| JP | 2020024580 A | 2/2020 |

OTHER PUBLICATIONS

Hasenjäger et al., "A Survey of Personalization for Advanced Driver Assistance Systems," IEEE Transactions on Intelligent Vehicles, 5(2):335-344, Nov. 29, 2019 (https://www.techfak.uni-bielefeld.de/~hwersing/HasenjaegerHeckmannWersing_TIV2020_print.pdf).

(Continued)

*Primary Examiner* — Nabil H Syed
*Assistant Examiner* — Cal J Eustaquio
(74) *Attorney, Agent, or Firm* — SHEPPARD, MULLIN, RICHTER & HAMPTON LLP; Daniel N. Yannuzzi

(57) ABSTRACT

The disclosure generally relates to a system comprising a memory and a processor configured to access the memory and execute the machine-executable instructions stored on the memory to determine that a target vehicle is engaging in an abnormal driving, determine that the abnormal driving exceeds a notification threshold parameter of an abnormal driving notification system, generate a notification, and monitor the ego vehicle and/or driver to alter notification threshold values based on the reactions of the ego vehicle and/or driver inputs.

18 Claims, 11 Drawing Sheets

(56) References Cited

U.S. PATENT DOCUMENTS

| | | | |
|---|---|---|---|
| 2004/0239509 A1* | 12/2004 | Kisacanin | G01S 13/878 |
| | | | 340/575 |
| 2016/0071417 A1* | 3/2016 | Lewis | G08G 1/162 |
| | | | 701/301 |
| 2021/0001887 A1 | 1/2021 | Wang | |
| 2021/0094581 A1 | 4/2021 | Lee | |
| 2022/0176992 A1 | 6/2022 | Nemoto | |

OTHER PUBLICATIONS

Zohrevand et al., "Should I Raise the Red Flag? An Analytic Review of Anomaly Scoring Methods toward Mitigating False Alarms," Apr. 14, 2019, 11 pages (https://arxiv.org/abs/1904.06646).

Hundman et al., "Detecting Spacecraft Anomalies Using LSTMs and Nonparametric Dynamic Thresholding," KDD '18: Proceedings of the 24th ACM SIGKDD International Conference on Knowledge Discovery & Data Mining, pp. 387-395, Jul. 19, 2018 (https://doi.org/10.1145/3219819.3219845).

Ucar et al., "Mining Movement Patterns for Distracted Driving Detection," 28th ITS World Congress 2022, Sep. 2022, Paper ID 1211936, 7 pages.

\* cited by examiner

CUSTOMIZABLE ABNORMAL DRIVING DETECTION

TECHNICAL FIELD

The present disclosure relates generally to notification systems and methods for abnormal driving maneuvers of target vehicles. More specifically, some implementations relate to altering notification thresholds based on reactions and/or inputs.

DESCRIPTION OF RELATED ART

Occasionally, driving scenarios exist where some vehicles engage in abnormal driving. The abnormal driving can be due to circumstances such as distracted drivers, reckless drivers, or aggressive drivers. For example, a driver may be eating food and driving, texting and driving, tailgating, speeding etc. These abnormal driving maneuvers can distract other drivers and result in accidents.

BRIEF SUMMARY OF THE DISCLOSURE

In one embodiment, the techniques described herein relate to a system including a memory and a processor configured to access the memory and execute machine-executable instructions stored in the memory to determine that a target vehicle is engaging in an abnormal driving, determine that the abnormal driving exceeds a notification threshold parameter of an abnormal driving notification system, generate a notification, and monitor the ego vehicle and/or driver to alter notification threshold values based on the reactions of the ego vehicle and/or driver inputs.

In one embodiment, the techniques described herein relate to a system comprising a memory storing machine-executable instructions and a processor configured to access the memory and execute the machine-executable instructions to determine that the target vehicle is engaging in abnormal driving, determine that the abnormal driving exceeds the default threshold value of an abnormal driving notification system, notify the driver of the ego vehicle that the target vehicle is engaging in abnormal driving, monitor the driver of the ego vehicle to determine a reaction of the driver of the ego vehicle upon notification of the target vehicle engaging in abnormal driving and alter the default threshold value of the abnormal driving notification system upon the driver reacting to the notification to generate a threshold value individually associated with the driver of the ego vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
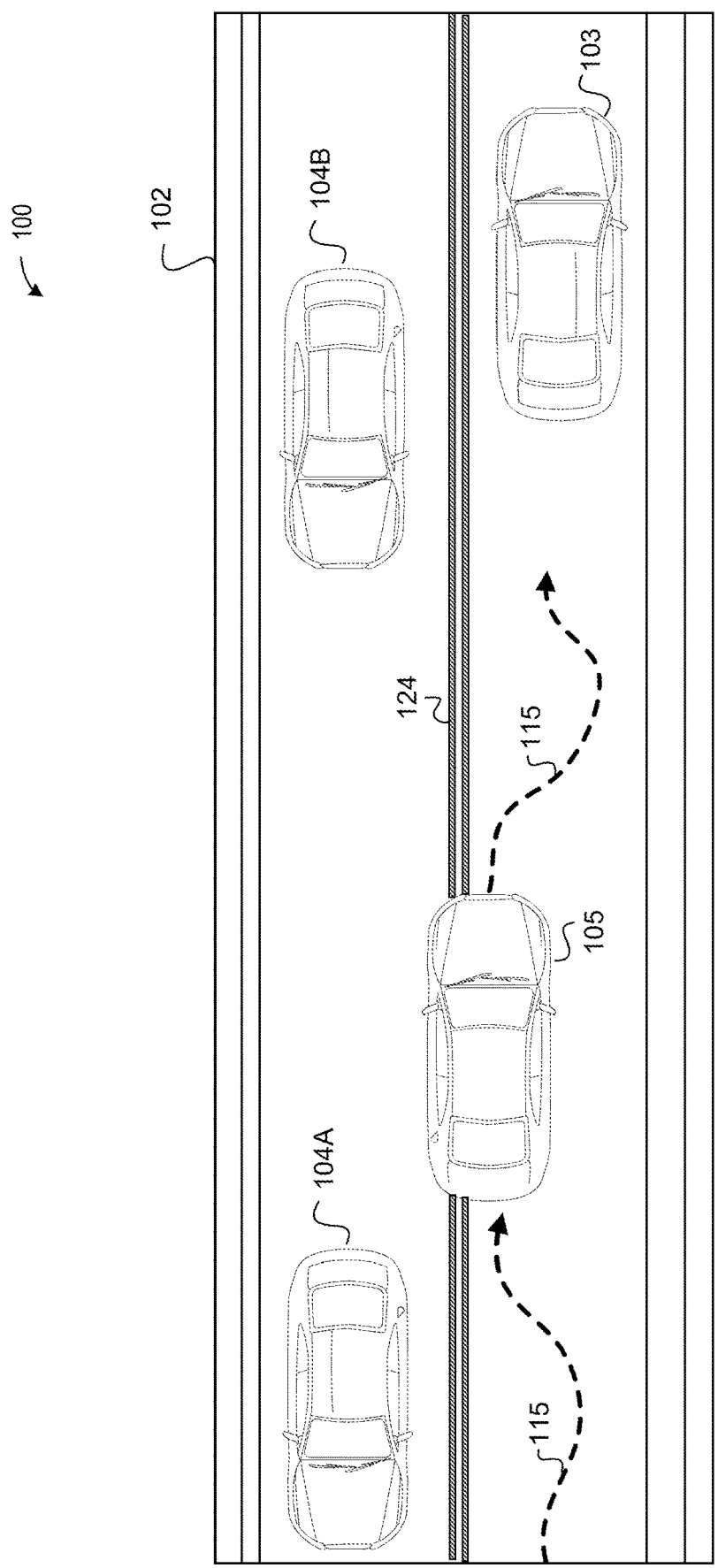
FIG. 1 depicts an example illustration of a vehicle environment in which the systems and methods disclosed herein may be applied, according to one embodiment.

The figures are not exhaustive and do not limit the present disclosure to the precise form disclosed.

DETAILED DESCRIPTION

Occasionally drivers of vehicles engage in abnormal driving (AD). "Abnormal" driving is any type of atypical vehicular activity that can directly or indirectly impact neighboring vehicles. "Directly" impacting neighboring vehicles includes physical impact of the vehicle engaging in AD (hereafter referred to as the "target vehicle") with the connected vehicle (hereafter referred to as the "ego vehicle"), or potential impact of the target vehicle with the ego vehicle. "Indirectly" impacting neighboring vehicles includes downline effects of the AD to neighboring vehicles. The downline effects are defined as effects that cause other neighboring vehicles originally not associated with the AD of the target vehicle to be affected by the neighboring vehicles directly affected by the AD (e.g., slowing traffic, and/or a traffic jam). According to one embodiment, "atypical" can be defined as the vehicle violating formal or informal rules associated with that roadway (i.e., right-of-way rules, or informal "rules-of-the road"). For example, atypical driving can include behavior that does not necessarily violate any formal or informal rules associated with the roadway, but can still result in an accident to either the target vehicle or the surrounding vehicles (e.g., aggressive/distracted/reckless driving). Thus, AD can affect not only the driver and passengers of the vehicle in the target vehicle, but also to other vehicles within a given proximity of the driver.

Current methods to improve vehicle safety typically include notifying a driver of an AD of a target vehicle. However, conventional driver/vehicle safety systems do not adjust the notification based on a preferred sensitivity. The preferred sensitivity can be based on a variety of factors. The variety of factors include the type of vehicle (e.g., a truck, a sedan, a convertible, a tractor etc.), the type of driver (e.g., a novice driver, a cautious driver, an aggressive driver etc.), the type of environment (e.g., a roadway with little traffic, a roadway with stand-still traffic, an on-ramp of a highway, an off-ramp of a highway, a two-lane road, a four-lane road, an urban environment, a rural environment) and/or location of the vehicle (e.g., the geographical proximity of the target vehicle to the ego vehicle, the geographical proximity of the ego vehicle to one or more vehicles in a roadway, etc.). Instead, conventional driver/vehicle safety systems warn drivers of AD of target vehicles, when the target vehicles violate a defined parameter, Embodiments of the systems and methods disclosed herein can be implemented to present an improvement over conventional driver/vehicle safety systems. Unlike conventional driver/vehicle safety systems, the methods disclosed herein allow the notification thresholds to be altered to individual preferences, such as based on the driver's reaction or input. In conventional systems the conventional driver/vehicles safety systems cannot be customizable to the driver's preferences. For example, if a target vehicle engages in only a slight deviation from the road, the driver of the ego vehicle may not want to be notified. The driver may only want to be notified once the target vehicle engages in a more severe deviation. The conventional driver/vehicle safety systems are set-up to engage or disengage based on a pre-determined default parameter. These systems cannot alter the parameters based on the driver's preferred sensitivity. Accordingly, over time, the conventional driver/vehicle safety systems can lose driver confidence/trust and produce mismatches, thereby reducing the effectiveness of the systems as intended. For example, the driver of the ego vehicle may think that the target vehicle (e.g., a following vehicle) is engaging in normal driving, but the ego vehicle safety systems interpret the target vehicle as engaging in AD.

Embodiments of the customizable AD systems and methods proposed herein, assist vehicle systems (e.g., AI agents and/or machine learning (ML) algorithms) and/or drivers by altering, or allowing customization of, the sensitivity of the vehicle safety system notifications. By altering the sensitivity of vehicle safety systems, the customizable AD system can minimize overaction/underreaction of the safety system, thus increasing driver confidence in the vehicle safety systems. The customizable AD system of the ego vehicle can be configured to gather data regarding the AD of the target vehicle. This data can be used to determine an amount of AD of the target vehicle. The amount of AD of the target vehicle can be ranked and indexed in an AD index. A greater amount of AD results in a higher AD value associated with the target vehicle. Each assigned AD value is stored in an AD index and may be rank ordered based on the AD value. The "amount" of AD includes a value of AD that is determined by a detection engine using a plurality of factors. In one embodiment, the plurality of factors include the "amount" of AD includes the geographical area of the roadway which the vehicle is engaging in the AD. The plurality of factors can further include the geographical width of the AD within a roadway (hereafter referred to as "AD width") and geographical length of the AD within a roadway (hereafter referred to as "AD length"). The "geographical width" is defined as an amount of geographical side to side travel of a vehicle within a roadway. Side to side travel is defined as the movement of the vehicle from one side of the roadway to another side of the roadway. Each side of the roadway is defined by the sides of the vehicle. For example, a first side of the vehicle and the roadway defined as the driver side of the vehicle and roadway, and a second side of the vehicle and the roadway defined as the non-driver side of the vehicle and roadway. Examples of side to side travel include swerving, bounding, oscillating, veering etc. The "geographical length" is defines as an amount of geographical distance that vehicle has traveled while engaging in AD. The distance is measured as the length of roadway that the vehicle has traveled on while engaging in AD. For example, the distance can be about 1 meter, about 2 meters, about 3 meters etc. The distance is measured along the length of the roadway. In one embodiment, the geographical width of the AD is about perpendicular to the geographical length of the AD. The plurality of factors are not limited to AD width and AD length, and can include any observable feature of an AD. For example, the plurality of factors can include the amount of swerving of a target vehicle, rapid acceleration/deceleration, uneven braking and acceleration, etc. Each factor is weighted by the detection engine. The weight of each factor is combined to create a total weighted value. The total weighted value is used to create the AD value.

In one embodiment, the amount of AD of a target vehicle further includes severity and duration. The severity of the AD can be defined as an amount of AD length and AD width. For example, a first severity of the AD can be an AD of 1 meter in width and 10 meters in length, while a second severity of the AD can be an AD of 2 meters in width, and 20 meters in length. The duration of the AD can be defined be an amount of time of the AD.

In one embodiment, the AD value is assigned based on the type of AD. For example, if a target vehicle that engages in a forceful braking maneuver, then the target vehicle is assigned an AD value of 1. If the target vehicle swerves within the lane, then the target vehicle is assigned an AD value of 2. If the target vehicle engages in swerving within a lane and forcefully brakes, then the target vehicle is assigned a value of 3. The AD of the target vehicle is assigned a value based on the amount of AD. As another example, the magnitude of the swerving or the amount of forceful braking can also be used to determine an assigned AD value. As yet another example, the duration of the maneuver can also be used to determine the value. For example, an AD event for a target vehicle that only briefly engaged in AD may be assigned a lower AD value than an AD event for a target vehicle that frequently engages in, or recently frequently engaged in, AD behavior.

In some embodiments, the value of the AD can be weighted based on other factors detected in the vicinity of the AD. For example, infrastructure data or crowd source data may detect the presence of an obstacle on the roadway. If the AD constitutes sudden breaking or swerving in the vicinity of the obstacle, the system may determine to assign a lower weight to that instance of AD, and may be further configured to alert the driver to the obstacle. As another example, similar unusual maneuvers that might be characterized as AD may be detected by the ego vehicle as occurring in a number of target vehicles in a particular area. In such a situation, the system may determine that there are external circumstances causing the AD these target vehicles. The system may be configured to adjust its notifications accordingly.

Each driver of the ego vehicle is assigned a default threshold AD value. In one embodiment, the customizable AD system monitors the target vehicle AD and the driver of the ego vehicle's reaction to determine whether the driver reacts to the notification. In one embodiment, the customizable AD system monitors the target vehicle AD and the driver of the ego vehicle's input to determine whether the driver would like to alter the sensitivity threshold of the notification of the customizable AD system.

In one embodiment, the AD of the target vehicle and the driver of the ego vehicle's reaction is determined via a customizable AD circuit. The customizable AD circuit includes a detection engine comprising the one or more processors configured to execute a detection algorithm stored as instructions within memory. The detection algorithms can include a variety of algorithms configured to detect patterns and events. For example the detection algorithms can include a machine learning algorithm, a time-series analysis and/or a pattern recognition. The one or more ML algorithms may be configured to determine whether the target vehicle is engaging in AD, and if the driver of the ego vehicle engages in an observable action when notified of the AD of the target vehicle. The "observable action" may include any action that can be monitored by one or more systems within the vehicle (i.e., data regarding the driver's reaction can be captured by one or more systems within the vehicle). For example, the driver's observable reaction can include engaging in a vehicle maneuver (e.g., the driver depressing the brake to slow down the vehicle, or the driver engaging the turn signal to signal that he/she desires to change lanes) upon notification of the AD of the target vehicle. The observable action can further include the driver engaging in a physical activity within the vehicle that does not directly impact systems of the vehicle at the time of the physical activity. For example, a driver looking over his/her shoulder, rubbernecking (e.g., turning his/her head while looking around at something) a scene, hand movements and/or posture movements (e.g., adjusting/altering his/her physical position within the vehicle. The detection engine may be further configured to adjust the sensitivity threshold AD value of the customizable AD system depending on the driver's observable reactions.

Training the detection engine to accurately adjust the threshold parameters of a customizable AD system is difficult as ML algorithms sometimes overfit or underfit data. Thus, to reduce or prevent overfitting and underfitting, the ML algorithms of the detection engine may be continuously trained using data comprising the driver of the ego vehicle's reaction and/or input. Data comprising the driver's reaction and/or input is continuously captured by one or more vehicle systems. By continuously capturing data, the detection engine can "learn" to adjust the threshold parameters on a variety of factors. The variety of factors include the type of vehicle (e.g., a truck, a sedan, a convertible, a tractor etc.), the type of driver (e.g., a novice driver, a cautious driver, an aggressive driver etc.), the type of environment (e.g., a roadway with little traffic, a roadway with stand-still traffic, an on-ramp of a highway, an off-ramp of a highway, a two-lane road, a four-lane road, an urban environment, a rural environment) and/or location of the vehicle (e.g., the geographical proximity of the target vehicle to the ego vehicle, the geographical proximity of the ego vehicle to one or more vehicles in a roadway, etc.).

The detection engine may be configured to adjust the threshold parameters based on whether the driver reacts to the notification. For example, if the driver of the ego vehicle is notified of the AD of the target vehicle and the driver engages in no observable reaction, the AD system can adjust the AD threshold parameters by adjusting the threshold value In this example, the customizable AD system may increase the AD threshold value. By increasing the threshold value, the sensitivity of the AD system decreases (e.g., the customizable AD circuit decreases the parameters of AD of a target vehicle that will trigger a notification). Accordingly, if the target vehicle engages in similar AD in future events that may not reach an AD level sufficient to meet the adjusted threshold value, the driver of the ego vehicle will not be notified of the AD.

In one embodiment, the customizable AD circuit is disposed within the ego vehicle. The customizable AD circuit communicates with various vehicle systems and sensors through wired and/or wireless means. The vehicle sensors and/or vehicle systems capture data comprising the environment surrounding the vehicle. The environment can include a target vehicle engaging in AD. The data captured by the vehicle sensors and/or vehicle systems is transmitted to the AD circuit. The AD circuit uses the data to determine whether an approaching target vehicle engaging in AD is approaching the ego vehicle. If the customizable AD circuit determines that an approaching target vehicle is engaging in AD, then the AD system uses one or more vehicle systems to notify the driver of the approaching target vehicle engaging in AD. "Approaching the ego vehicle" is defined as a lessening of the geographic distance between target vehicle and the ego vehicle.

The driver may be notified of the approaching target vehicle via a plurality of in-vehicle notification systems and methods (i.e., a heads-up display, an audible alarm, a navigation screen etc.). For example, when the target vehicle is within a set geographic distance to the ego vehicle, the customizable AD system notifies (e.g., alters) the driver of the approaching target vehicle. By notifying the driver of the approaching target vehicle engaging in AD, the driver can make various driving decisions (e.g., engaging defensive driving maneuvers) to increase the safety of the ego vehicle and surrounding vehicles.

In one embodiment, the customizable AD circuit is hosted on a cloud server. The cloud server communicates wirelessly with the vehicle via one or wireless methods of communication. The wireless methods of communication include vehicle to everything (V2X) methods of communication. The V2X methods of communication include vehicle to cloud (V2C), cloud to vehicle (C2V), vehicle to vehicle (V2V), and vehicle to infrastructure (V2I) methods of communication.

Data comprising the environment surrounding the vehicle (i.e., driving environment) is captured by one or more vehicle sensors and sent to the cloud server via the V2X communication methods. For example, data captured by an ego vehicle can be transmitted between the cloud server and the vehicle via vehicle to cloud (V2C), cloud to vehicle (C2V), vehicle to vehicle communication (V2V), and vehicle to infrastructure (V2I) methods.

In one embodiment, the cloud server receives data captured by one or more vehicle sensors. The cloud server uses the vehicle sensor data to determine whether a target vehicle engaging in AD is approaching the ego vehicle. Once the personalized abnormal driver detection system determines that a target vehicle is approaching the ego vehicle, the personalized abnormal driver detection system notifies the driver and monitors the driver's reaction/input to the notification.

In one embodiment, the cloud server uses data captured by one or more connected vehicles to determine whether a target vehicle is engaging in AD. The one or more connected vehicles communicate with the cloud server using the V2X communication methods. In one embodiment, the cloud server uses data captured by a vehicular micro cloud communication methods. One or more connected vehicles can form a vehicular micro cloud. The vehicular micro cloud can captured data comprising the environment surrounding the vehicular micro cloud. The data can be transmitted to the AD system where it can be used to determine whether a target vehicle is engaging in AD. Additional details related to forming vehicular micro clouds are described in U.S. Pat.

No. 10,587,998 B2, application Ser. No. 17/945,495 and application US20220075365A1, the disclosure of which is incorporated herein by reference in its entirety. A vehicular micro cloud is formed when a client device, seeking a collaborative execution of an operational task, sends a request to form a vehicular micro cloud to the cloud server.

The request includes formation rules identifying a target location and information defining the task to be executed in the vehicular micro cloud. The cloud server selects a location within the target location and triggers formation of at least one vehicular micro cloud at the geographic location. The vehicular micro cloud encompasses a defined physical area surrounding the geographic location. The area may be pre-defined by the cloud server and/or defined by the client device as part of the request. The cloud server sets the client device as the micro cloud leader. The cloud server adds any RSE as a cloud member and detects connected vehicles (e.g., ego vehicle) that are within or pass through the area. The connected vehicles may be detected based on GPS coordinates communicated to cloud server. In some embodiments, cloud member capabilities may be leveraged by the cloud server to detect vehicles within the area (e.g., via an image sensor or other sensor of the sensor set). The micro cloud members can then share resources and capabilities to collaborate on the task, included in the request, by transmitting resource data to the cloud server. For example, micro cloud members may share resource data including, but not limited to, image frames and/or video feeds from image sensors, image processing results from image frames and/or video frames, object detection results from proximity sensors, GPS coordinates, computation results from subsystems processing data received from sensor sets. Resource data can be aggregated together to provide collaborative results relevant to the requested task. In some embodiments, aggregation of the sensor data may be performed at the cloud server, while in other embodiments aggregation may be performed at the client device.

The vehicular micro cloud formation system includes software that is operable, when executed by the cloud server to cause the cloud server to execute one or more of the following operations: (1) receiving a request from the client device for an on-demand vehicular micro cloud to collaborate on a task; (2) determining whether one vehicular micro cloud is sufficient for the task or if a plurality of vehicular micro clouds are needed; (3) determining whether to form the one or more vehicular micro clouds as stationary and/or mobile vehicular micro clouds; (4) forming an on-demand vehicular micro cloud; and (5) causing the on-demand one or more vehicular micro cloud generated at operation (3) to coordinate execution of one or more tasks that are described by data.

FIG. 1 is a schematic diagram of an example environment 102 in which a customizable AD system 100 can be implemented. The example environment 102 includes a portion of a roadway comprising a plurality of vehicles. The plurality of vehicles include an ego vehicle 103, vehicle 104A, vehicle 104B and a target vehicle 105 engaging in an AD 115. Vehicles 104A and 104B may each provide similar functionality to the ego vehicle 103. Ego vehicle 103 may be any type of vehicle. For example, ego vehicle 103 may be a car; a truck; a sports utility vehicle; a bus; a semi-truck; a drone or any other roadway-based conveyance.

The portion of the roadway includes a two lanes of travel in opposing directions. Each lane is separated by a centerline 124. As seen in FIG. 1, the target vehicle 105 is engaging in an AD that results in the target vehicle 105 crossing the centerline 124.

The customizable AD system 100 improves ego vehicle safety by notifying the driver of the ego vehicle of the AD of the target vehicle if the AD value, assigned to the AD by the detection engine, 303 exceeds a sensitivity threshold. By selectively notifying the driver of the AD of the target vehicle, the customizable AD system 100 can improve/develop/maintain driver confidence in the customizable AD system 100. Too often, conventional vehicle safety systems lose driver trust by either overreacting or underacting. Over time, the conventional driver/vehicle safety systems lose driver confidence/trust and produce mismatches, thereby reducing the effectiveness of the systems as intended. By monitoring the driver's reaction, the customizable AD system 100 can determine the driver's preferences, thereby adjusting the threshold to notify the driver of AD events that he/she find relevant.

In one embodiment, the AD is determined by a detection engine 303 in the customizable AD detection circuit 310. The detection engine 303 includes a processor 306 and memory 308. The processor 306 is configured to execute one or more ML algorithms, stored in memory 308, to perform at least one of: (i) detecting a target vehicle; (ii) detecting AD of the target vehicle; (iii) classifying AD of the target vehicle; and (iv) detecting driver reactions. For example, the detection engine 303 can function as a classifier to determine whether a target vehicle is engaging in AD and whether a driver is reacting to the target vehicle engaging in AD. In one embodiment, the instructions provide for the processor 306 to assign a value to the AD. The AD value is stored in an AD index in memory. The higher the AD value the higher the likelihood that the AD will be above the default threshold value, as driver concern typically increases as the vehicle behavior becomes more abnormal. For example, if the default threshold value is set to an AD value of 2, then an AD value of 3 will trigger a notification to the driver of the ego vehicle that a target vehicle is engaging in AD. The customizable AD system 100 monitors the driver's reaction to determine whether the threshold value should be adjusted. As explained in further detail herein, in addition to determining whether a target vehicle is engaging in AD, the detection engine 303 is configured to determine whether the driver of the ego vehicle is engaging in an observable reaction to an AD of the target vehicle. For example, in one embodiment, the driver's observable reaction includes engaging in a vehicle maneuver (e.g., the driver depressing the brake to slow down the vehicle, or the driver engaging the turn signal to signal that he/she desires to change lanes) upon notification of the AD of the target vehicle. In one embodiment, the observable action includes the driver engaging in a physical activity within the vehicle that does not directly impact systems of the vehicle at the time of the physical activity. For example, a the driver looking over his/her shoulder.

Data used to determine AD can be captured by one or more sensors in the ego vehicle 103, or by one or more connected vehicles within a geographical proximity (e.g., a set geographical location) of the ego vehicle 103. The "geographical proximity" includes any geographical distance sufficient for near field communication between connected vehicles using one or more V2V communication methods. The captured data can include any type of data which can be used to discern the behavior of a target vehicle. For example, in one embodiment, data can be captured by one or more infrared sensors located within the ego vehicle. The infrared sensors can capture data that is used by the cloud server to determine whether a specific traffic formation exists.

The detection engine 303 is trained using feedback data. Feedback data is captured by one or more vehicle sensors. The sensors include the vehicle sensors 352 as described in FIG. 3. The sensors include in vehicle external image sensors 360 and in-vehicle sensors 323. The sensors capture data and send data to the detection engine 303 comprising the classifier engine. The detection engine 303 uses the feedback data to continuously tune its determination of whether a target vehicle is engaging in an AD. The feedback data is sent to and received by the classifier engine. The sensors, classifier engine and ML methods are discussed in further detail in FIG. 3.

In another embodiment, each connected vehicle (e.g., a target vehicle that is also a connected vehicle) is monitored by the cloud server 405. When the cloud server 405 determines that one or more connected vehicle is engaging in AD, the cloud server can send the notification to the ego vehicle 103 using V2X communication. The cloud server 405 can further use V2X communication to monitor the location of the target vehicle and determine whether the target vehicle is engaging in AD.

V2X communication includes V2I, V2C, C2V and V2V communication. As used herein, "connected vehicle" refers to a vehicle that is actively connected to edge devices, other vehicles, and/or a cloud server via a network through V2X communication comprising V2I, V2C, C2V and/or V2V communications. An "unconnected vehicle" refers to a vehicle that is not actively connected. That is, for example, an unconnected vehicle may include communication circuitry capable of wireless communication (e.g., V2X, V2I, V2V, etc.), but for whatever reason is not actively connected to other vehicles and/or communication devices. For example, the capabilities may be disabled, unresponsive due to low signal quality, etc. Further, an unconnected vehicle, in some embodiments, may be incapable of such communication, for example, in a case where the vehicle does not have the hardware/software providing such capabilities installed therein.

As used herein, the words "geographic location," "location," "geographic proximity," "proximity," "geographic position" and "position" refer to a latitude and longitude of an object (or, a latitude, longitude, and elevation of an object), such as a connected vehicle, a RSE, a client device, etc. As used herein, the words "geographic area", and "area," refer to a physical space surrounding a geographic location (e.g., an area of defined space surrounding a geographic location or position).

Figure 2:
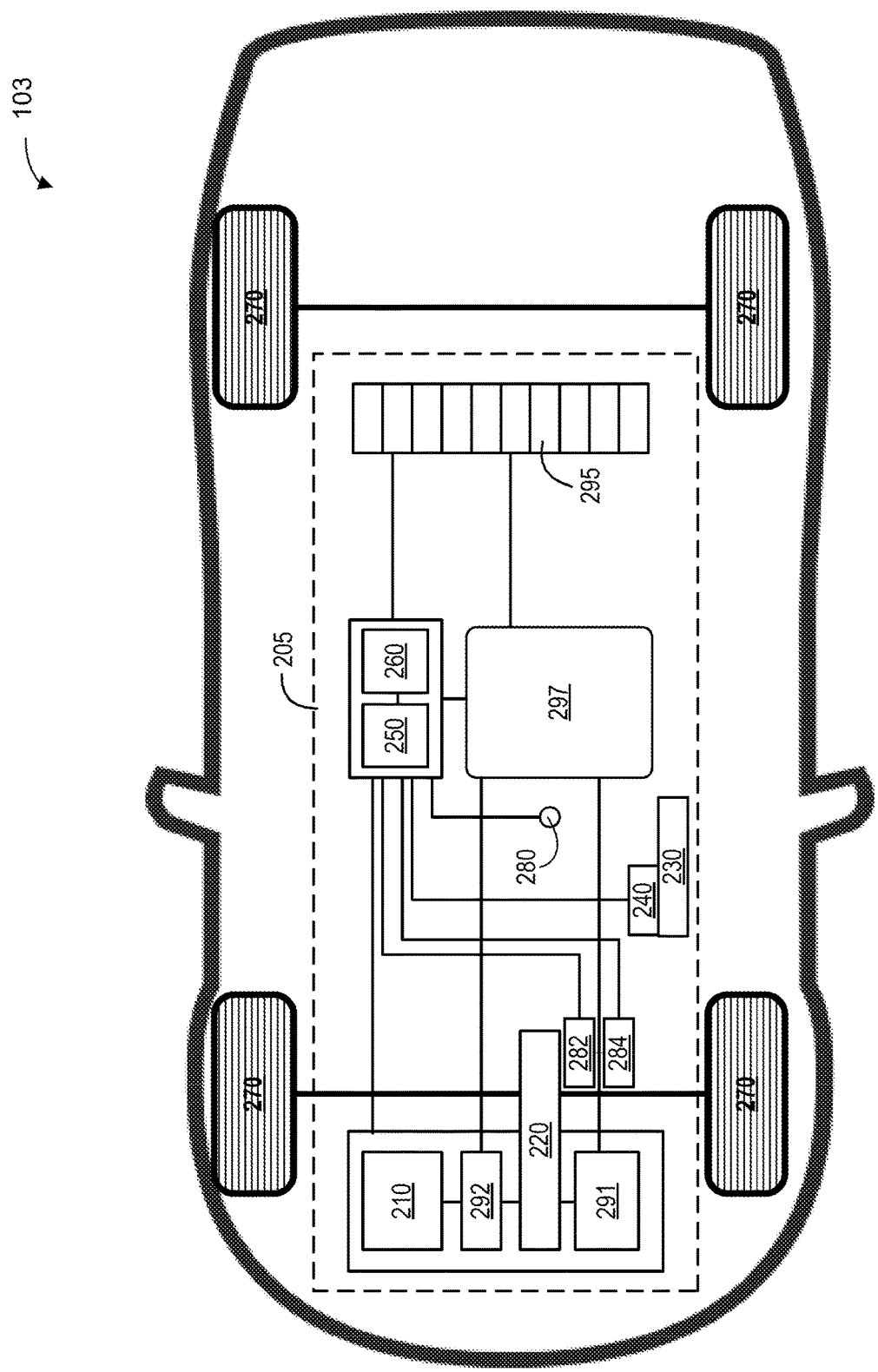
FIG. 2 depicts an example vehicle in which the systems and methods disclosed herein may be applied, according to one embodiment.

FIG. 2 illustrates an example hybrid electric vehicle (HEV) 200 in which various embodiments for autonomous and semi-autonomous steering alterations based on a driver profile may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, and not solely HEVs.

Here, HEV 200 includes drive force unit 205 and wheels 270. Drive force unit 205 includes an engine 210, motor generators (MGs) 291 and 292, a battery 295, an inverter 297, a brake pedal 230, a brake pedal sensor 240, a transmission 220, a memory 260, an electronic control unit (ECU) 250, a shifter 280, a speed sensor 282, and an accelerometer 284.

Engine 210 primarily drives the wheels 270. Engine 210 can be an ICE that combusts fuel, such as gasoline, ethanol, diesel, biofuel, or other types of fuels which are suitable for combustion. The torque output by engine 210 is received by the transmission 220. MGs 291 and 292 can also output torque to the transmission 220. Engine 210 and MGs 291 and 292 may be coupled through a planetary gear (not shown in FIG. 2). The transmission 220 delivers an applied torque to the wheels 270. The torque output by engine 210 does not directly translate into the applied torque to the wheels 270.

MGs 291 and 292 can serve as motors which output torque in a drive mode, and can serve as generators to recharge the battery 295 in a regeneration mode. The electric power delivered from or to MGs 291 and 292 passes through inverter 297 to battery 295. Brake pedal sensor 240 can detect pressure applied to brake pedal 230, which may further affect the applied torque to wheels 270. Speed sensor 282 is connected to an output shaft of transmission 220 to detect a speed input which is converted into a vehicle speed by ECU 250. Accelerometer 284 is connected to the body of HEV 200 to detect the actual deceleration of vehicle 200, which corresponds to a deceleration torque.

Transmission 220 is a transmission suitable for an HEV. For example, transmission 220 can be an electronically controlled continuously variable transmission (ECVT), which is coupled to engine 210 as well as to MGs 291 and 292. Transmission 220 can deliver torque output from a combination of engine 210 and MGs 291 and 292. The ECU 250 controls the transmission 220, utilizing data stored in memory 260 to determine the applied torque delivered to the wheels 270. For example, ECU 250 may determine that at a certain vehicle speed, engine 210 should provide a fraction of the applied torque to the wheels while MG 291 provides most of the applied torque. ECU 250 and transmission 220 can control an engine speed (N E) of engine 210 independently of the vehicle speed (V).

ECU 250 may include circuitry to control the above aspects of vehicle operation. ECU 250 may include, for example, a microcomputer that includes a one or more processing units (e.g., microprocessors), memory storage (e.g., RAM, ROM, etc.), and I/O devices. ECU 250 may execute instructions stored in memory to control one or more electrical systems or subsystems in the vehicle. ECU 250 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 291 and 292 each may be a permanent magnet type synchronous motor including for example, a rotor with a permanent magnet embedded therein. MGs 291 and 292 may each be driven by an inverter controlled by a control signal from ECU 250 so as to convert direct current (DC) power from battery 295 to alternating current (AC) power, and supply the AC power to MGs 291, 292. MG 292 may be driven by electric power generated by motor generator MG 291. It should be understood that in embodiments where MG 291 and MG 292 are DC motors, no inverter is required. The inverter, in conjunction with a converter assembly may also accept power from one or more of MGs 291, 292 (e.g., during engine charging), convert this power from AC back to DC, and use this power to charge battery 295 (hence the name, motor generator). ECU 250 may control the inverter, adjust driving current supplied to MG 292, and adjust the current received from MG 291 during regenerative coasting and braking.

Battery 295 may be implemented as one or more batteries or other power storage devices including, for example, lead-acid batteries, lithium ion, and nickel batteries, capacitive storage devices, and so on. Battery 295 may also be charged by one or more of MGs 291, 292, such as, for example, by regenerative braking or by coasting during which one or more of MGs 291, 292 operates as generator. Alternatively (or additionally, battery 295 can be charged by MG 291, for example, when HEV 200 is in idle (not moving/not in drive). Further still, battery 295 may be charged by a battery charger (not shown) that receives energy from engine 210. The battery charger may be switched or otherwise controlled to engage/disengage it with battery 295. For example, an alternator or generator may be coupled directly or indirectly to a drive shaft of engine 210 to generate an electrical current as a result of the operation of engine 210. Still other embodiments contemplate the use of one or more additional motor generators to power the rear wheels of a vehicle (e.g., in vehicles equipped with 4-Wheel Drive), or using two rear motor generators, each powering a rear wheel.

Battery 295 may also be used to power other electrical or electronic systems in the vehicle. Battery 295 can include, for example, one or more batteries, capacitive storage units, or other storage reservoirs suitable for storing electrical energy that can be used to power MG 291 and/or MG 292. When battery 295 is implemented using one or more batteries, the batteries can include, for example, nickel metal hydride batteries, lithium ion batteries, lead acid batteries, nickel cadmium batteries, lithium ion polymer batteries, and other types of batteries.

Figure 3:
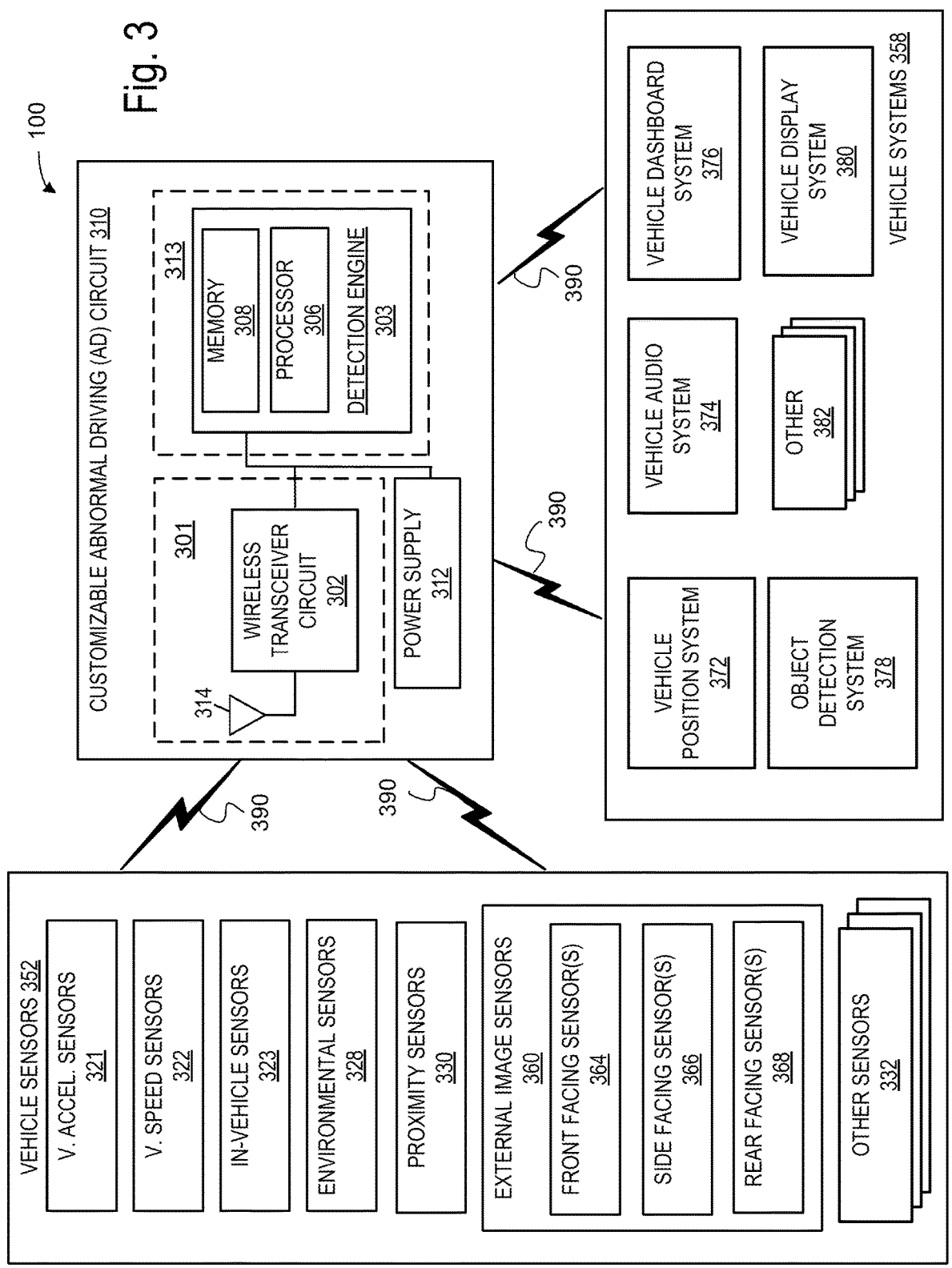
FIG. 3 depicts an example network architecture of a customizable abnormal driving system, according to one embodiment.

FIG. 3 illustrates an example of a customizable AD system 100 disposed within an ego vehicle, according to one embodiment. The customizable AD system 100 includes a customizable AD circuit 310 communicatively connected to a plurality of sensors 352 and a plurality of vehicle systems 358. Sensors 352 and vehicle systems 358 wirelessly communicate with the customizable AD circuit 310. Although in this example sensors 352 and vehicle systems 358 are depicted as communicating with the customizable AD circuit 310, they can also communicate with each other as well as with other vehicle systems. The customizable AD circuit 310 can be implemented as an ECU or as part of an ECU such as, for example electronic control unit 250. In other embodiments, the customizable AD circuit 310 can be implemented independently of the ECU 250.

The customizable AD circuit 310 in this example includes a communication circuit 301, a decision circuit 313 comprising a detection engine 303 and a power supply 312. The detection engine includes a processor 306 and memory 308.

Processor 306 can include one or more GPUs, CPUs, microprocessors, or any other suitable processing system. Processor 306 may include a single core or multicore processors. The memory 308 may include one or more various forms of memory or data storage (e.g., flash, RAM, etc.) that may be used to store instructions and variables for processor 306 as well as any other suitable information, such as, one or more of the following elements: rules data; resource data; GPS data; and base data, as described below. Memory 308 can be made up of one or more modules of one or more different types of memory, and may be configured to store data and other information as well as operational instructions that may be used by the processors 306 and 396.

In one embodiment, the detection engine 303 includes one or more ML algorithms trained to perform a decision (e.g., classify data comprising target vehicle actions and driver reactions). In one embodiment, the ML algorithm is configured to classify target vehicle driving as AD or not AD. In one embodiment, the one or more ML algorithms include a neural network. The detection engine 303 processor 306 is configured to execute one or more ML algorithms, stored in memory 308, to perform at least one of: (i) detecting a target vehicle; (ii) detecting AD of the target vehicle; (iii) classifying AD of the target vehicle; and (iv) detecting driver reactions. For example, in one embodiment, the detection engine 303 is configured to determine whether the target vehicle that is engaged in an abnormal driving maneuver based on the data received by the one or more vehicle sensors 352 and/or vehicle systems 358. In one embodiment, the detection engine 303 includes autoencoders trained with distance-to-collision and speed profiles corresponding to normal behavior to allow the detection engine 303 to differentiate between AD by virtue of high reconstruction errors. Reconstructions errors can be expected to assume relatively lower values when an input sample is similar to a safe following distance and can conversely by expected to assume relatively high values when an input sample is different from training data. The detection engine 303 is further configured to classify ego vehicle driver reactions upon receiving a notification of the target vehicle AD from the customizable AD system. For example, the detection engine 303 can function as a classifier to determine whether the driver is reacting to the notification of the AD of the target vehicle.

The detection engine 303 can be trained using data comprising parameters that define abnormal driving behavior of a target vehicle. For example, abnormal driving behavior of target vehicles can include swerving, aggressively braking, tail gating, rapidly accelerating etc. As explained in further detail below, parameters associated with each vehicle behavior can be determined and used to teach (i.e., learn) the classifier engine. In addition, the detection engine 303 can be trained using data comprising parameters that define driver reactions to the abnormal driving behavior of a target vehicle. For example, the driver looking over his/her shoulder, the driver repeatedly checking the rearview mirror, the driver engaging the turn signal to change lanes, the driver depressing the brake or accelerator etc., in response to the target vehicle engaging in abnormal driving behavior.

Figure 5:
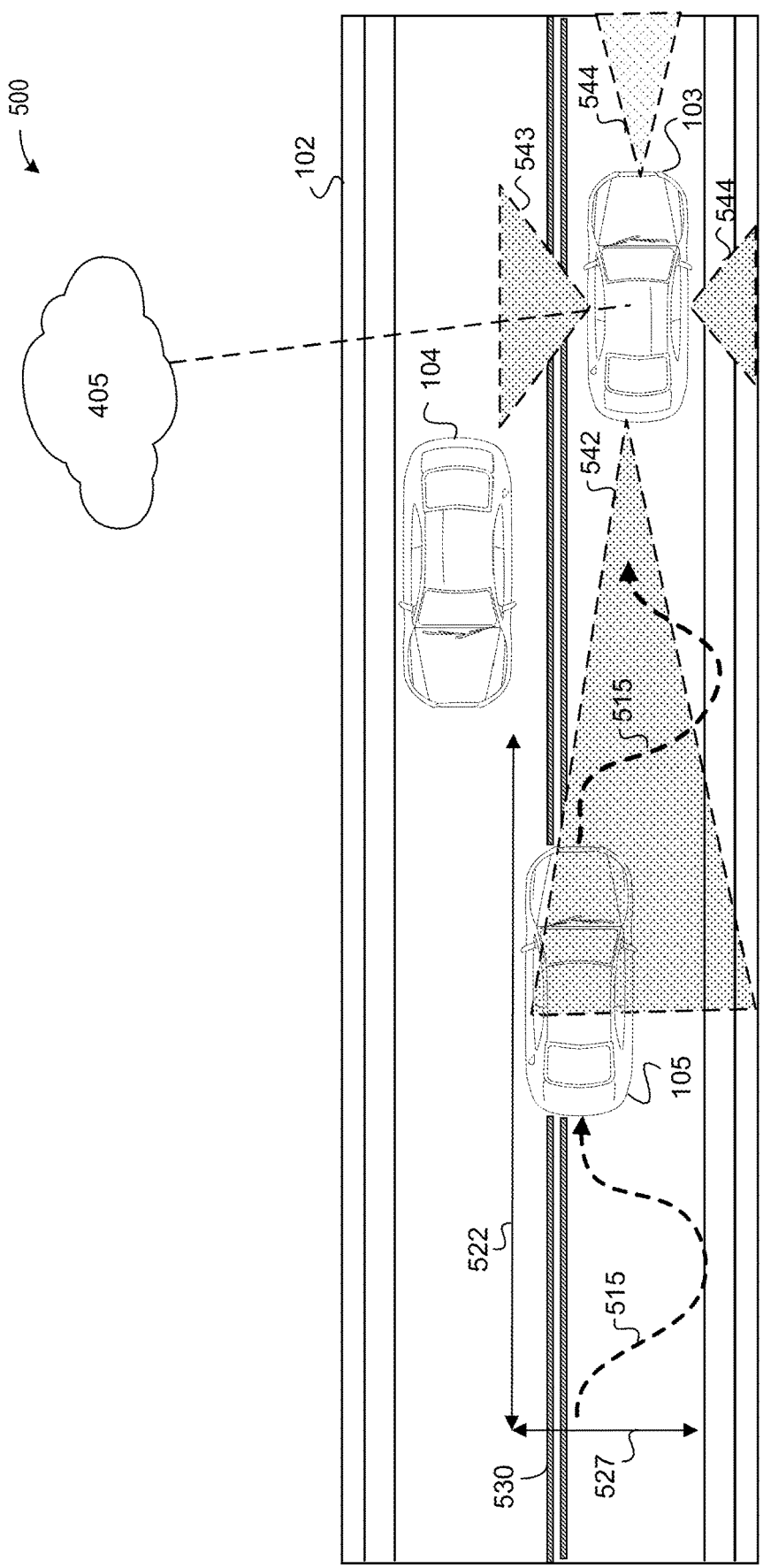
FIG. 5 depicts an example illustration of an abnormal driving of a target vehicle, according to one embodiment.
Figure 6:
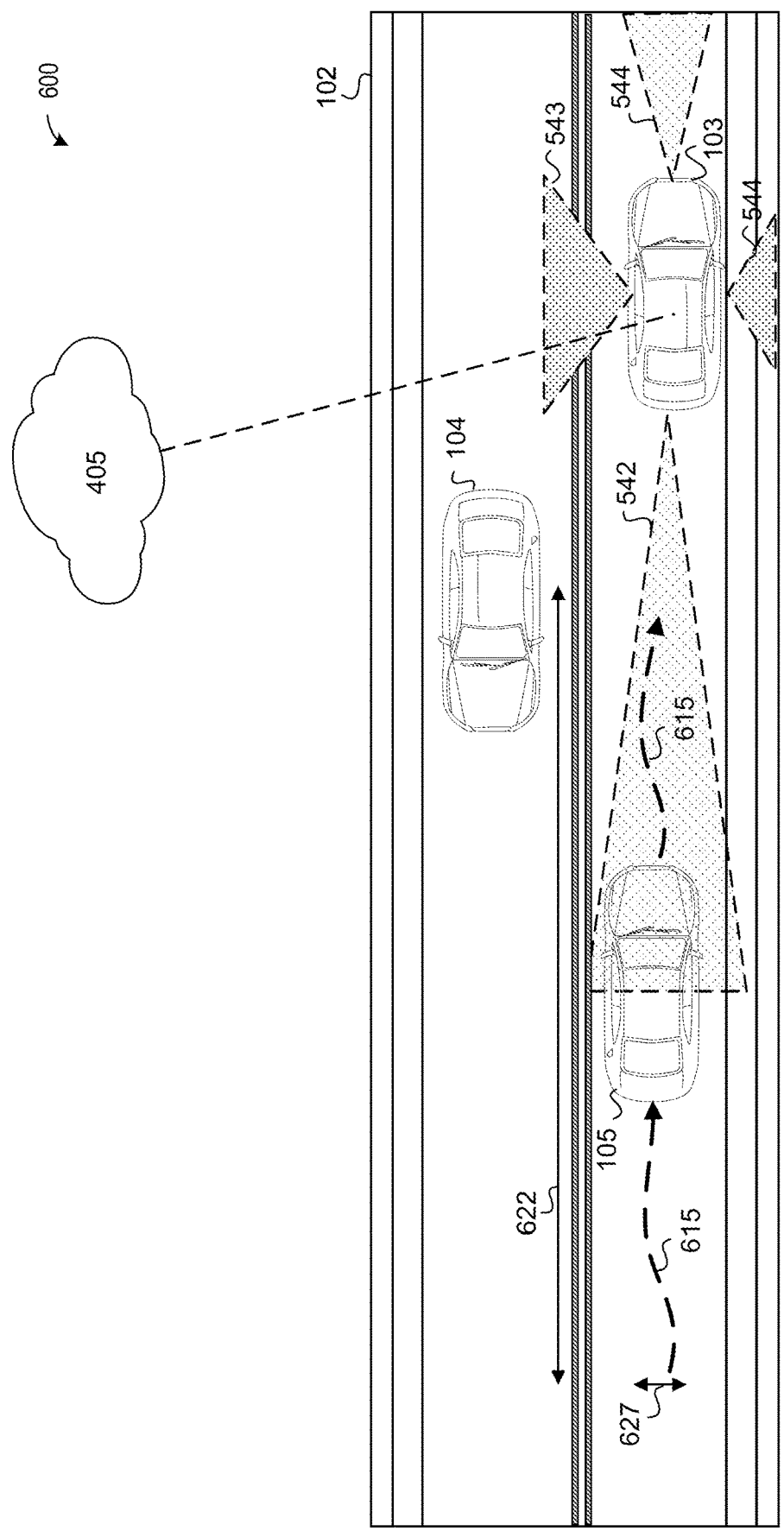
FIG. 6 depicts an example illustration of an abnormal driving of a target vehicle, according to one embodiment.

Data captured by vehicle sensors 352 is used to train the detection engine 303. The detection engine 303 uses captured data associated with the target vehicle 105 to classify the target vehicle 105 actions. By classifying the target vehicle 105 actions, the detection engine 303 can determine whether the target vehicle 105 is engaging an AD and accordingly assign an AD value a for each AD driving. For example, if the target vehicle engages in an aggressive braking maneuver, the detection engine 303 can classify the driving maneuver as an abnormal driving maneuver. For example, if the target vehicle 105 swerves within the lane (as seen in FIGS. 1, 5 and 6) the detection engine 303 can classify the driving maneuver as an abnormal driving maneuver. If the target vehicle rapidly accelerates the detection engine 303 can classify the driving maneuver as an abnormal driving maneuver. By storing AD values in an AD index, the detection engine 303 can reference parameters associated with previously assigned AD values for future abnormal driving maneuvers. Thus, the detection engine 303 can use the parameters associated with each AD value to continuously train the detection engine by continuously adding additional AD values to the AD index.

The detection engine is further trained to "customize" the abnormal driver detection. For the purposes of the disclosure herein, "customize" refers to altering/adjusting/tuning the sensitivity of the driver notification of the AD of a target vehicle according to his/her observable reactions. Altering/adjusting/tuning the sensitivity of the driver notification includes determining whether to notify the driver of the ego vehicle 103 whether the target vehicle is engaging in AD. For example, as seen in FIG. 5 a target vehicle may engage in a first AD that the customizable AD system 100 determines is greater than an AD threshold sensitivity value (i.e., an AD sufficient to necessitate notification to the driver). In comparison, as seen in FIG. 6 a target vehicle may engage in a second AD that the customizable AD system 100 determines is less than an AD threshold sensitivity value (i.e., an AD insufficient to necessitate notification to the driver). The determination of whether to notify the driver of the AD is determined by the customizable AD circuit, and is specific to each driver based on learned observable driver reactions. If the customizable AD circuit 310 assigns an AD value to the target vehicle AD that is above the threshold value, then the customizable AD system will notify the driver of the target vehicle AD. If the customizable AD circuit 310 assigns an AD value to the target vehicle AD that is below the threshold value, then the customizable AD system will not notify the driver of the target vehicle AD. Accordingly, using data comprising the driver's reaction and/or input (e.g., feedback data), the customizable AD circuit can determine whether the driver of the ego vehicle should be notified of the AD of the target vehicle. In one embodiment, each driver of the vehicle is associated with his/her own driver profile that includes a default sensitivity that can be adjusted according to his/her reactions and/or inputs.

In one embodiment, data comprising the ego vehicle driver's reactions is used to train the detection engine 303. The ego vehicle driver's actions can include physical actions (e.g., looking over his/her shoulder, scanning his/her surroundings, etc.) and/or vehicle maneuvers (e.g., applying the brake pedal to decrease the speed of the ego vehicle, applying the accelerator pedal to increase the speed of the ego vehicle, engaging the turn signal to change lanes, etc.) Data is used to train the detection engine 303 to determine whether the driver is reacting to the notification system. When a target vehicle engages in an abnormal driving maneuver, the detection engine uses data comprising the driver's action to determine whether the driver is reacting to the notification. For example, if the target vehicle engages in an aggressive braking maneuver, the detection engine can determine whether the driver is reacting to the abnormal driving maneuver of the target vehicle. In one embodiment, the detection engine is configured as a classifier engine to determine whether the driver is reacting to the abnormal driving maneuver of the target vehicle. Data comprising the driver's actions is used to train the detection engine.

In one embodiment, the ego driver can input data to train the detection engine 303. The "input" can include a manual input via one or more manual methods. For example, the driver can apply a manual input using a control knob, a touch screen, a switch, etc., located within the vehicle. In one embodiment, the driver can "input" the data to train the detection engine 303 using a user device such as a smartphone or personal computer. As explained further herein, the ego driver's input is used to adjust the threshold value depending on the driver's notification preferences. For example, the driver may not want to be notified of minor target vehicle AD (e.g., a low AD value). Accordingly, the driver of the ego vehicle 103 can alter the default threshold value using the input. By altering the threshold, the customizable AD system is trained to adjust notification of target vehicle AD based on the new threshold value. Future target vehicle AD with values beneath the threshold values of the threshold parameters will not trigger a notification. Future target vehicle AD above the threshold values will trigger an customizable AD system notification of target vehicle AD.

The ego vehicle driver can further increase the threshold parameters of the AD system using the driver input and/or driver reaction by reacting to AD of the target vehicle that is assigned an AD value below the sensitivity threshold value. For example, if the driver engages in an observable reaction to the target vehicle AD or alters the threshold value via an input but the target vehicle AD is minor enough to have an AD value beneath the default threshold value, the customizable AD system 100 can alter the threshold value to notify the driver of target vehicle AD associated with values beneath the default sensitivity values.

Once the detection engine 303 is trained, the detection engine 303 can determine future driver reactions using the parameters learned during the training, including for example, receiving data comprising the driver's reaction to determine whether the target vehicle is engaging in an abnormal driving behavior.

Although the example of FIG. 3 is illustrated using processor and memory circuitry, as described below with reference to circuits disclosed herein, decision circuit 313 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the customizable AD circuit 310.

Communication circuit 301 includes either or both a wireless transceiver circuit 302 with an associated antenna 314 and a wired I/O interface with an associated hardwired data port (not illustrated). Communication circuit 301 can provide for V2X communications capabilities, allowing the customizable AD circuit 310 to communicate with edge devices, such as roadside equipment (RSE), network cloud servers and cloud-based databases, and/or other vehicles.

As this example illustrates, communications with the customizable AD circuit 310 can include either or both wired and wireless communications circuits 301. Wireless transceiver circuit 302 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by the customizable AD circuit 310 to/from other entities such as sensors 352 and vehicle systems 358.

Power supply 312 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

In the illustrated example, sensors 352 include vehicle acceleration sensors 321, vehicle speed sensors 322, wheel-spin sensors 323 (e.g., one for each wheel), environmental sensors 328 (e.g., to detect salinity or other environmental conditions), proximity sensor 330 (e.g., sonar, radar, lidar or other vehicle proximity sensors), and image sensors 360. Additional sensors (i.e., other sensors 332) can be included as may be appropriate for a given implementation of customizable AD system 100.

The vehicle sensors 352 include in-vehicle sensors 323 and external image sensors 360. The in-vehicle sensors 323 are configured to capture data comprising driver reactions. The in-vehicle sensors 323 include any sensor capable of determining whether the driver engaged in an observable driving reaction (e.g., a camera sensor, a motion sensor, a thermal sensor, an infrared sensor, a capacitive touch sensor, a weight sensor, a resistance sensor etc.). The external image sensors 360 include front facing image sensors 364, side facing image sensors 366, and/or rear facing image sensors 368. Image sensors may capture information which may be used in detecting not only vehicle conditions but also detecting conditions external to the ego vehicle 103 as well. Image sensors that might be used to detect external conditions can include, for example, cameras or other image sensors configured to capture data in the form of sequential image frames forming a video in the visible spectrum, near infra-red (IR) spectrum, IR spectrum, ultra violet spectrum, etc. Image sensors 360 can be used to, for example, to detect objects in an environment surrounding ego vehicle 103, for example, traffic signs indicating a current speed limit, road curvature, obstacles, surrounding vehicles, and so on. For example, one or more image sensors 360 may capture images of neighboring vehicles in the surrounding environment. As another example, object detecting and recognition techniques may be used to detect objects and environmental conditions, such as, but not limited to, road conditions, surrounding vehicle behavior (e.g., driving behavior and the like), parking availability, etc. Additionally, sensors may estimate proximity between vehicles. For instance, the image sensors 360 may include cameras that may be used with and/or integrated with other proximity sensors 330 such as LIDAR sensors or any other sensors capable of capturing a distance. As used herein, a sensor set of a vehicle may refer to sensors 352 and image sensors 360 as a set.

Environment sensors 328 includes one or more range sensors such as, but not limited to, LiDAR, radar sensor, sonar, IR sensors and other like sensors that can be used to gather data to measure distances and closing rates to various external objects. Environment sensors also includes one or more image sensors 360, such as cameras (e.g., visible light cameras, IR cameras, thermal cameras, ultrasound cameras, and other cameras) or other image sensors, to capture images of the environment around the vehicle. Information from image sensors can be used, for example, by vehicle systems 358 to determine information about the environment surrounding the vehicle 103 including, for example, information regarding other objects surrounding vehicle 103. For example, image sensors 360 capture video images from which vehicle systems 358 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors can be used in conjunction with other information such as map data or information from vehicle position system 372 to determine, refine or verify vehicle information.

In various embodiments, one or more of image sensor 360 are monocular image sensors configured to capture monocular videos as a plurality of frames in the form of monocular images (e.g., images). As described herein, a "monocular image" is an image from a single (e.g., monocular) camera, and encompasses a field-of-view (FOV) of at least a portion of the surrounding environment (e.g., a subregion of the surrounding environment). A monocular image may not include any explicit additional modality indicating depth nor any explicit corresponding image from another camera from which the depth can be derived (e.g., no stereo image sensor pair). In contrast to a stereo image, that may integrate left and right images from separate cameras mounted side-by-side to provide an additional depth channel, a monocular image does not include explicit depth information such as disparity maps derived from comparing the stereo images pixel-by-pixel. Instead, a monocular image may implicitly provide depth information in the relationships of perspective and size of elements depicted therein. The monocular image may be of a forward-facing (e.g., the direction of travel), 60-degree FOV, 90-degree FOV, 120-degree FOV, a rear/side facing FOV, or some other subregion based on the positioning and characteristics of the image sensor on a vehicle (e.g. vehicle 10).

Monocular images include visual data of the FOV that is encoded according to an image standard (e.g., codec) associated with the image sensor 360. Characteristics of the image sensor 360 and the image standard define a format of the image. Thus, while the particular characteristics can vary according to different implementations, the image has a defined resolution (e.g., height and width in pixels) and format based on the image sensor and image standard. For example, the monocular images may be based on a red-green-blue (RGB) color model. In further aspects, the images can be infrared images associated with a corresponding infrared camera, a black/white images, cyan-magenta-yellow (CMY) images based on the CMY color model, or another suitable format as may be desired.

Other sensors 332 may be provided as well. Other sensors 332 may be used to provide input to the personalized ADD circuit 310 or other vehicle position systems 372 so that the systems have information useful to operate in an autonomous, semi-autonomous or manual mode.

Vehicle systems 358 include any of a number of different vehicle components or subsystems used to control or monitor various aspects of the vehicle and its performance. In this example, the vehicle systems 358 includes a vehicle positioning system 372; vehicle audio system 374 comprising one or more speakers configured to deliver audio throughout the vehicle; object detection system 378 to perform image processing such as object recognition and detection on images from image sensors 360, proximity estimation, for example, from image sensors 360 and/or proximity sensors, etc. for use in other vehicle systems; suspension system 380 such as, for example, an adjustable-height air suspension system, or an adjustable-clamping suspension system; and other vehicle systems 382 (e.g., (e.g., Advanced Driver-Assistance Systems (ADAS), such as forward/rear collision detection and warning systems, pedestrian detection systems, autonomous or semi-autonomous driving systems, and the like).

The vehicle positioning system 372 includes a global positioning system (GPS). Ego vehicle 103 and the one or more connected vehicles 104 may be DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

Conventional GPS communication includes a GPS satellite in communication with a vehicle comprising a GPS tracking device. The GPS tracking device emits/receives a signal to/from the GPS satellite. For example, a GPS tracking device is installed into a vehicle. The GPS tracking device receives position data from the GPS tracking device. The position data gathered from the vehicle is stored in the tracking device. The position data is transmitted to the cloud server via a wireless network.

A conventional GPS provides positional information that describes a position of a vehicle with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the location of the vehicle with lane-level accuracy. In addition, the current standard for DSRC requires that the location of the vehicle be described with lane-level accuracy.

As used herein, the words "geographic location," "location," "geographic position" and "position" refer to a latitude and longitude of an object (or, a latitude, longitude, and elevation of an object), such as a connected vehicle, an RSE, a client device, etc. As used herein, the words "geographic area", and "area," refer to a physical space surrounding a location (e.g., an area of defined space surrounding a geographic location or geographic position). The example embodiments described herein may provide positioning information that describes a geographic position of a vehicle with an accuracy of one or more of: (1) at least plus or minus 1.5 meters in relation to the actual geographic position of the vehicle in two dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Network may be a conventional type of network, wired or wireless, and may have numerous different configurations including a star configuration, token ring configuration, or other configurations. Furthermore, the network may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 3G, 4G, 5G, LTE, LTE-V2V, LTE-V2I, LTE-V2X, LTE-D2D, VoLTE, 5G-V2X or any other mobile data network or combination of mobile data networks. Further, the network may include one or more IEEE 802.11 wireless networks.

In one embodiment, vehicle sensors 352 determine the geographic proximity of the target vehicle the ego vehicle. The vehicle sensors communicate with the customizable AD circuit 310 to determine whether a target vehicle is approaching the ego vehicle. The customizable AD system 100 uses the data to determine the location (i.e., proximity) of the target vehicle 105 to the ego vehicle 103. For example, vehicle position data is sent to and received by the customizable AD system 100. The customizable AD system 100 uses the data to determine the proximity of the target vehicle 105 to the ego vehicle.

Once the customizable AD system 100 determines that a target vehicle is engaging in an AD, the customizable AD system 100 notifies the driver using one or more notification methods. In one embodiment, the notification methods include the vehicle systems 358 comprising the vehicle audio system 372 and the vehicle dashboard system 376. The notification methods includes visual and/or audible methods of informing the driver of the ego vehicle 103 of the AD of the target vehicle 105. In one embodiment, the notification methods include notifying the driver of the ego vehicle 103 via one or more vehicle systems 358 of the ego vehicle 103. For example, in one embodiment, the driver is notified via the vehicle audio system 374 (e.g., instructions played/broadcasted over one or more vehicle speakers), the vehicle display system 380 and/or the vehicle dashboard system 376. In one embodiment, the driver is notified of the AD by a device within the instrument cluster and/or the dashboard GUI. The notification can include visual instructions (e.g., visual directions on how to proceed), and/or auditory instructions (e.g., verbal commands from the customizable AD system 100 to the driver).

The image data generally includes one or more monocular images (e.g., monocular image) each containing a scene of an environment surrounding the image sensor (e.g., image sensor) that captures the image, a plurality of which define a monocular video. The image data may be RGB images or images according to a desired color model, as described above. Each monocular image may implicitly provide depth information (e.g., depth values) of the scene in the relationships of perspective and size of elements depicted therein from which the depth model may derive a depth map for the respective image. The depth map may comprise a plurality of pixels arranged in two dimensional space (e.g., X and Y) and comprise a depth value for the respective image. These depth values may be derived using the depth model based on the depth information implicit to the monocular image and depth measures from the sparse depth data and uncertainty data, as described below.

Range sensor data includes data received from one or more range sensors (e.g., radar sensor). The range sensor data includes depth measures indicating distances from the range sensor to features in the surrounding environment. The range sensor data may be provided as a 3D point cloud. The 3D point cloud is sparse or generally incomplete for a corresponding scene such that only sparsely distributed points within a scene are annotated by the depth measures as opposed to a dense point cloud that provides per-pixel depth measures or nearly per-pixel depth measures for the scene. That is, only those points for which a depth measure is detected by the range sensor are included in point cloud. A point cloud is generally provided in a 3D coordinate space (e.g., X, Y, and Z).

While the range sensor data is generally described as originating from a radar sensor, embodiments herein are applicable to depth data from LiDAR or another range sensors. Furthermore, the range sensor data itself generally includes depth/distance information relative to a point of origin such as the range sensor, and may also include coordinates (e.g., x, y within an image) corresponding with separate depth measurements.

In various embodiments, range sensor data is projected onto an image plan to derive sparse depth data. For example, the 3D point cloud included in the range sensor data may be projected onto a 2D point image plan annotated with depth measures based on Z coordinates of points in the point cloud. For example, each point of the 3D point cloud is provided at a position within a 3D coordinate space (e.g., X, Y, and Z). The X and Y coordinates of each point can be projected to x and y coordinates on the 2D image plane, such that each point in the 3D point cloud corresponds to a pixel in the 2D image plane. Each projected pixel is then annotated with a depth measure derived from the Z coordinate of the corresponding point, which is a depth measurement for the pixel. In a case of where the sparse depth data is provided as a sparse depth map, each pixel on the 2D image plane can be annotated with a visual attribute (e.g., a color or other visual marker) corresponding to the depth measure of the corresponding point relative to other points in the point cloud.

Various range sensor, such as radar sensors, suffer from sparsity such that the 3D point cloud is sparsely populated. Thus, when the 3D point cloud is projected to a 2D image plane, some x and y coordinates in the image plane may correspond to positions within the 3D coordinates that do not contain a point (e.g., the range sensor did not detect a returned signal for the position). In this case, the pixels on the 2D image plane are deemed invalid, because the pixel does not have any valid depth measures due to a lack of a projected point. As such, the 2D image plane contains a sparse number of pixels and is referred to herein as a sparse depth data.

Figure 4:
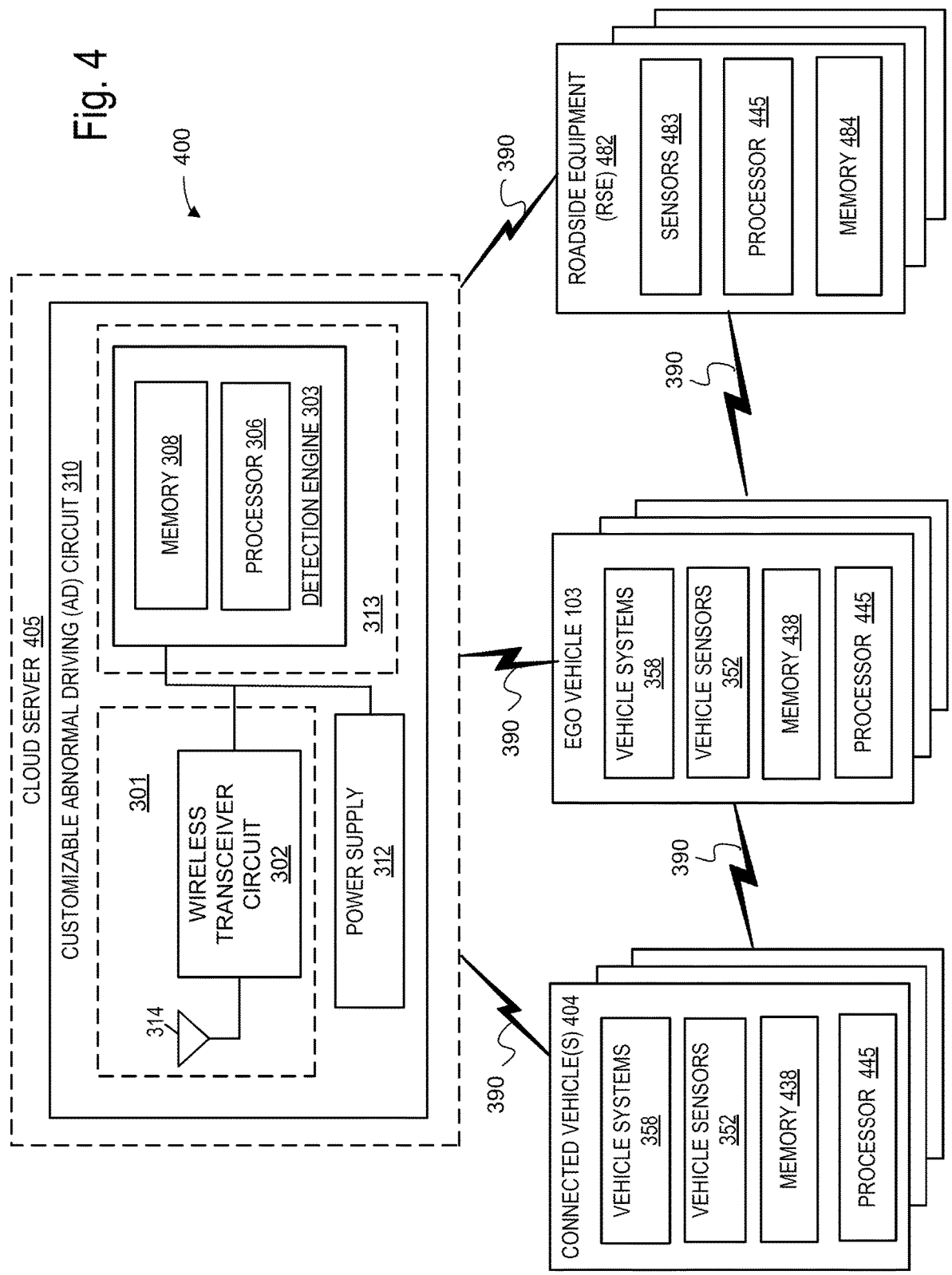
FIG. 4 depicts an example network architecture of a customizable abnormal driving system, according to one embodiment.

FIG. 4 is an example V2X network architecture 400 of the customizable AD circuit 310 in accordance with various embodiments disclosed herein. The network architecture 400 includes the cloud server 405 comprising the customizable AD circuit 310, a connected vehicle 404 (e.g., vehicles 104A, 104B), the ego vehicle 103 and a roadside equipment (RSE) 482 infrastructure component of a roadway. The cloud server 405, connected vehicle 404, ego vehicle 103 and RSE 482 can all communicate with one another. For example, connected vehicle 404 can communicate with the ego vehicle 103, and the ego vehicle 103 can communicate with the RSE 482. In some embodiments, connected vehicle 404 includes a communication circuitry comprising hardware and software that is needed to enable the connected vehicle 404 to communicate with the ego vehicle 103, RSE 482 and/or cloud server 405 via network 390. The ego vehicle is also a "connected vehicle", but for explanation purposes is referred to as the "ego vehicle". In one embodiment, the connected vehicle 104 includes the same or similar vehicle systems and sensors as the ego vehicle. Using one or more sensors and/or vehicle systems, the connected vehicle 104 can collaborate on the task of providing a precise location of the ego vehicle 103 by leveraging their respective sensor sets (e.g., sensors 352, systems 358, and/or image sensors 360 of FIG. 3).

In one embodiment, data comprising target vehicle 105 behavior is transmitted to the AD circuit 310 via V2X communication methods. Data comprising the target vehicle 105 AD is received by the customizable AD circuit 310 via one or more V2X communication methods (e.g., V2I communication with RSU 482, V2C/C2V communication with the cloud server 405, and/or V2V communication with one or more connected vehicles 104). The data is used by the AD circuit 310 to determine whether the target vehicle 105 is engaging in AD.

Captured data comprising target vehicle 105 behavior can be transmitted from the one or more connected vehicle 104 or RSU units to the cloud server 405 to the vehicle via one or more V2X communication methods. In one embodiment, the V2I communication method includes target vehicle 105 communication to the cloud server 405 via RSE 482 (e.g., the target vehicle 105 is a connected vehicle that communicates data comprising AD of the target vehicle 105 to the customizable AD circuit 310). The target vehicle's behavior can be determined using the RSE 482. The RSE 482 includes sensors 482, processor(s) 445 and/or memory 484. The RSE 482 is in communication with the cloud server 405. For example, RSE can receive data comprising the location of the ego vehicle 103, and communicate the data to cloud server 405 via network 390. Inversely, the cloud server 405 can communicate with either directly with the ego vehicle via a C2V communication method or to the RSE, which can subsequently relay the data from the cloud server 405 to the ego vehicle 103. In one embodiment, the V2V communication method includes ego vehicle 103 communication with one or more connected vehicles 104A-104B. The one or more connected vehicles 104A-104B can communicate with the ego vehicle 103. In one embodiment, the one or more connected vehicles 104A-104B relay data from the cloud server 405 to the ego vehicle 103. In one embodiment, the one or more connected vehicles 104A-104B relay data from the ego vehicle 103 to the cloud server 405. In addition, when the one or more connected vehicles 104A-104B are within a proximity to other vehicles, they can create a local network and exchange data with the ego vehicle 103.

As used herein, "connected vehicle" refers to a vehicle that is actively connected to edge devices, other vehicles, and/or a cloud server via a network through V2X communication comprising V2I, V2C, C2V and/or V2V communications. An "unconnected vehicle" refers to a vehicle that is not actively connected. That is, for example, an unconnected vehicle may include communication circuitry capable of wireless communication (e.g., V2X, V2I, V2V, etc.), but for whatever reason is not actively connected to other vehicles and/or communication devices. For example, the capabilities may be disabled, unresponsive due to low signal quality, etc. Further, an unconnected vehicle, in some embodiments, may be incapable of such communication, for example, in a case where the vehicle does not have the hardware/software providing such capabilities installed therein.

The V2X network is a communication network that enables entities such as elements of the operating environment to wirelessly communicate with one another via one or more of the following: Wi-Fi; cellular communication including 3G, 4G, LTE, 5G, etc.; Dedicated Short Range Communication (DSRC); millimeter wave communication; etc. The V2X includes V2I, V2C, C2V and/or V2V communications.

For example, connected vehicle(s) 404 and ego vehicle 103 may have V2X communication capabilities, allowing vehicle 404 to communicate with RSE 482. For example, RSE 482 may be a vehicle-to-infrastructure (V2I)-enabled street light or camera. Connected vehicle 404 and ego vehicle 103 may also communicate with other connected vehicle 404 over vehicle-to-vehicle (V2V) communications. In one configuration, the connected vehicle(s) include memory and computing components similar to or the same as the ego vehicle 103. For example, the connected vehicles(s) 404 can include a memory 438 and a processor 445.

In one embodiment, data is received by the ego vehicle 103 from one or more connected vehicles 104 and/or RSE 482 via one or more V2X communication methods (e.g., V2I communication with RSE 482, V2C/C2V communication with the cloud server 405, and/or V2V communication with one or more connected vehicles 104. For example, in one embodiment roadway data can be transmitted from the one or more connected vehicles 104 to the ego vehicle 103. Furthermore, in one embodiment, roadway data can be transmitted from ego vehicle 103 to the cloud server directly via V2C or C2V communication methods or via the RSE 482 as a relay to the cloud via V2I communication methods.

It should be understood that sometimes, a vehicle itself may act as a network node or edge computing device. For example, connected vehicle 404 may be a network edge device. The data gathered by the connected vehicle 404, either through their own sensors, or other data sources, e.g., RSE 482 and other vehicles, may be ultimately be transmitted to the cloud, e.g., the cloud server 405 and cloud-based memory 308 via network 390.

Cloud server 405 may be an edge server or a cloud server. The cloud server 405 can communicate with RSE 482, connected vehicle 404 and/or ego vehicle 103. The cloud server 405 may be one or more cloud-based instance of processor-based computing device residents communicatively connected to RSE 482, ego vehicle 103 and/or connected vehicle 404. The cloud server 405 may include circuitry to control various aspects of the customizable AD system 100 described herein. Cloud server 405 may include, for example, a microcomputer that includes a one or more processing units (e.g., microprocessors), memory storage (e.g., RAM, ROM, etc.), and I/O devices. As seen in FIG. 4, the cloud server 405 includes the detection engine 303 comprising a memory 308 and a processor 306. The processor 306 is configured to execute instructions stored in memory 308. The instruction stored in memory 308 include ML algorithms configured to determine whether the target vehicle 105 is engaging in AD and/or whether the driver is reacting to a notification by the vehicle that the target vehicle is engaging in AD above a threshold.

In one embodiment, data comprising the AD can be captured via a vehicular micro cloud. The data comprising AD of the target vehicle can be captured via V2V communication between the vehicles in the micro cloud. The data comprising AD can be exchanged between each vehicle in the vehicular micro cloud and communicated to the cloud server 405 via the V2X communication methods described herein. For example, vehicles within the vehicular micro cloud can communicate with the customizable AD circuit 310 via V2C and C2V methods of communication. A micro cloud is formed when a client device, seeking collaborative execution of an operational task, sends a request to form a micro cloud to the cloud server 405. The request includes formation rules identifying a target location and information defining the task to be executed in the vehicular micro cloud. The cloud server 405 selects a location within the target location and triggers formation of at least one micro cloud at the geographic location. The micro cloud encompasses a defined physical area surrounding the geographic location. The area may be pre-defined by the cloud server 405 and/or defined by the client device as part of the request. The cloud server 405 sets the client device as the cloud leader. The cloud server 405 adds any RSE (i.e., RSE 482) as a cloud member and detects connected vehicles (i.e., ego vehicle 103) that are within or pass through the area. The connected vehicles may be detected based on GPS coordinates communicated to cloud server 405. In some embodiments, cloud member capabilities may be leveraged by the cloud server 405 to detect vehicles within the area (e.g., via an image sensor or other sensor of the sensor set). The cloud members can then share resources and capabilities to collaborate on the task, included in the request, by transmitting resource data to the cloud server 405. For example, cloud members may share resource data including, but not limited to, image frames and/or video feeds from image sensors, image processing results from image frames and/or video frames, object detection results from proximity sensors, GPS coordinates, computation results from subsystems processing data received from sensor sets. Resource data can be aggregated together to provide collaborative results relevant to the requested task. In some embodiments, aggregation of the sensor data may be performed at the cloud server 405, while in other embodiments aggregation may be performed at the client device.

The vehicular micro cloud formation system includes software that is operable, when executed by the cloud server 405, to cause the cloud server 405 to execute one or more of the following operations: (1) receiving a request from the client device for an on-demand vehicular micro cloud to collaborate on a task; (2) determining whether one vehicular micro cloud is sufficient for the task or if a plurality of vehicular micro clouds are needed; (3) determining whether to form the one or more vehicular micro clouds as stationary and/or mobile vehicular micro clouds; (4) forming an on-demand vehicular micro cloud; and (5) causing the on-demand one or more vehicular micro cloud generated at operation (3) to coordinate execution of one or more tasks that are described by the base data 421.

FIG. 5 is an example illustration of a first AD of the target vehicle 105. The first AD 515 of the target vehicle 105 includes a first AD width 527 and a first AD length 522. The first AD 515 includes an AD comprising a swerving by the target vehicle 105. As shown by the dotted line, the swerving results in the target vehicle 105 crossing the center line 530. Data comprising the first AD 515 of the target vehicle 105 is captured by one or more vehicle sensors 352. The data is used by the detection engine 303 in the customizable AD circuit 310 to determine if the AD 515 violates a default threshold value. The AD system 100 includes a default AD sensitivity value. The detection engine 303 assigns an AD value to the first AD 515. If the assigned value of the AD is above the threshold value, then the customizable AD system 100 notifies the driver of the ego vehicle 103 of the AD of the target vehicle 105. If the determined AD value is above a threshold, and the driver of the ego vehicle 103 does not react to the notification (e.g., the driver ignores the notification) or does not provide a driver input, then AD system 100 alters the sensitivity of the AD threshold value so that future target vehicle ADs with the same AD value will not result in a notification. Inversely, if the driver reacts to the notification and/or provides a driver input, the AD system 100 may determine that the threshold value sensitivity is sufficient and therefore does not need to be further adjusted. Thus the detection engine 303 can alter the threshold sensitivity value based on the driver reactions and/or input (e.g., feedback). In addition, the detection engine 303 can alter the threshold value if the customizable AD system determines that a target vehicle is engaging in an AD that is insufficient for ego vehicle driver notification (e.g., the target vehicle AD value is lower than the threshold), yet the driver reacted and/or provided a driver input to alter the threshold sensitivity value. Moreover if the detection engine 303 determines that the driver consistently reaction to notifications, the detection engine 303 can decrease the threshold sensitivity value.

If the customizable AD system 100 determines that the AD of the target vehicle does not exceed the threshold value of the notification system, then the driver of the ego vehicle will not be notified. If the driver is not notified of the AD of the target vehicle, but reacts to the AD of the target vehicle, the customizable AD system 100 will lower the threshold value so that future AD of the target vehicle that resulted in the driver's reaction will be greater than the threshold value (e.g., the threshold value will be altered to notify the driver).

In one embodiment, decreasing the threshold sensitivity value increases the amount of notifications that the driver of the ego vehicle 103 receives as smaller (e.g., more finite) AD of the target vehicle 105 results in a notification. In one embodiment, increasing the threshold sensitivity value decreases the amount of notifications that the driver of ego vehicle 103 receives as only larger AD of the target vehicle 105 results in a notification. In this embodiment. "Larger" and "smaller" AD is defined as an increase in first AD width 527 and first AD length 522. However "Larger" and "smaller" AD is not limited to width and length as AD can include atypical vehicle behavior, as defined above, that does not include swerving. In one embodiment, "Larger" and "smaller" AD refers to greater amounts of AD and lesser amounts of AD. For example as seen in FIG. 5, the first AD 515 includes a first AD width 527 and a first AD length 522, that is greater than a second AD width 627 of the second AD 615 and a second AD length 622 of the second AD 615 as seen in FIG. 6.

In one embodiment, by altering the threshold, the customizable AD system is able to alter the detection engine 303 to increase or decreases the frequency (e.g., amount) of notifications of the AD of the target vehicle that the ego vehicle driver may not desire to be notified of/find relevant. By altering the frequency of notifications of AD of the target vehicle the customizable AD system to remove notifications that the driver of the ego vehicle 103 may not desire to be notified of, the customizable AD system 100 can improve driver trust.

FIG. 6 is an example illustration of a second AD 615 of the target vehicle 105. The second AD 615 of the target vehicle includes a second width 627 and a second length 722. Similarly to the first AD 515, the second AD 615 includes a swerving of the target vehicle 105. However, the second AD 615 of the target vehicle 105 includes a second width 627 that is smaller than the first width 527.

In this example, the second AD 615 is not assigned an AD value by the detection engine 303 sufficient to overcome the threshold value. Because the second AD 615 is not assigned a threshold value sufficient to overcome the threshold value, the driver of the ego vehicle is not notified of the second AD 615 of the target vehicle. However, if the driver of the ego vehicle 103 reacted and/or provided an input to the second AD 615, then the detection engine 303 would decrease the threshold value so that future ADs of the target vehicle that are assigned similar AD values would result in the AD system notifying the driver of the AD of the target vehicle. For purposes of the disclosure herein "same" or "similar" AD values refer to AD values that are about the same. Values that are "about the same" include values that are within about 1 percent, or about 2.5 percent, or about 3 percent, or about 4.5 percent, or about 5 percent similar. Values that are "about the same" include values that would result in the detection engine 303 assigning a value that would cause the customizable AD system to reacting in the same or similar manner.

Figure 7:
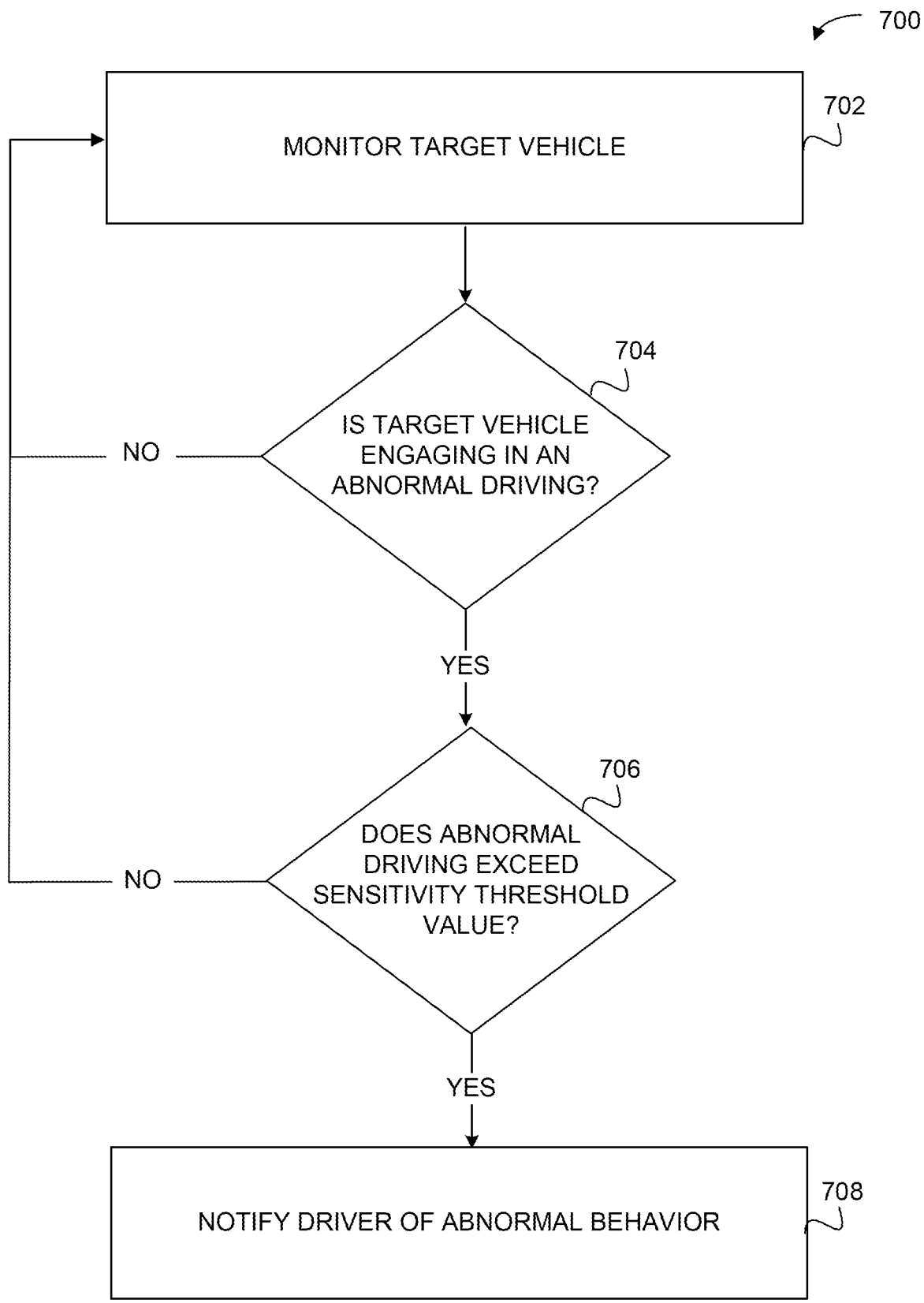
FIG. 7 depicts a method of notifying the driver of an ego vehicle of the abnormal driving of a target vehicle, according to one embodiment.

FIG. 7 is an illustration of a method 700 of implementing the customizable AD system 100, according to one embodiment. The method 700 includes monitoring the target vehicle 105, via one or more vehicle sensors 352 and/or vehicle systems 358, to determine that the target vehicle 105 is engaging in AD. Once the customizable AD system 100 determines that the target vehicle 105 is engaging in AD, the AD system 100 assigns an AD value to the target vehicle 105. If the AD value exceeds a default threshold value, the customizable AD system 100 notifies the driver of the ego vehicle of the target vehicle AD. Depending on the ego vehicle driver's reaction and/or input, the customizable AD system 100 alters the threshold value of the customizable AD system 100. By altering the threshold value, the AD system 100 can alter the amount of target vehicle AD that results in the customizable AD system 100 notifying the driver (e.g., the ego vehicle driver can alter the sensitivity of the customizable AD system 100 so that the driver of the ego vehicle is notified of a first AD of a target vehicle 105 but not a second AD of the target vehicle, and vice versa).

At activity 702, the method 700 includes monitoring a target vehicle 105. The customizable AD system 100 uses one or more vehicle sensors 352 and/or one or more vehicle systems 358 to monitor the target vehicle 105. Monitoring the target vehicle 105 includes capturing data regarding the target vehicle's driving behavior. The one or more vehicle sensors 352 are configured to capture data comprising target vehicle 105 behavior. In one embodiment, the customizable AD circuit 310 receives data from one or more connected vehicles 104, and/or RSE 482. In one embodiment, the target vehicle 105 is monitored using one or more V2X communication methods. For example, the target vehicle 105 is a connected vehicle that transmits data to a cloud server 405 via V2V, V2C and/or V2I communication methods. In one embodiment, the target vehicle 105 is monitored using a vehicular micro cloud. The data, captured by monitoring the target vehicle, is used by the customizable AD circuit 310 to determine that the target vehicle 105 is engaging in AD.

At activity 704, the detection engine 303, of the customizable AD circuit 310, uses the data comprising target vehicle 105 driving behavior to determine whether the target vehicle 105 is engaging in AD. The AD of the target vehicle is assigned a value based on the amount of AD. The "amount" of AD includes a value of AD that is determined by the detection engine 303 using a plurality of factors. In one embodiment, the plurality of factors includes the "amount" of AD includes the total geographical area of the roadway affected by the AD. The geographical area includes AD width and AD length. The AD width and AD length are assigned values based on the distance of AD across the width of the roadway and the length of the roadway. The plurality of factors are not limited to AD width and AD length, and can include any observable feature of an AD. For example, the plurality of factors can include the amount of swerving of a target vehicle, rapid acceleration/deceleration, uneven braking and acceleration, etc. Each factor is weighted by the detection engine 303. The weight of each factor is combined to create a total weighted value. The total weighted value is used to create the AD value. The factors can include the speed of the target vehicle, the deceleration of the target vehicle, the acceleration of the target vehicle, swerving of the target vehicle. The amount of any one of these factors is assigned a weight. For example, if the target vehicle engages in swerving and deceleration, the totality of the factors will influence the AD value, to cause the AD value to increase. The amount of AD of the target vehicle is ranked and indexed in an AD index. A greater amount of AD the higher the AD value associated with the target vehicle. Each assigned AD value is stored in an AD index and rank ordered based on the AD value.

In one embodiment, the AD value is assigned based on the type of AD. Each type of AD is assigned a value and stored in the AD index. For example, a target vehicle that engages in a forceful braking maneuver is assigned an AD value of 1. A vehicle that swerves within the lane is assigned an AD value of 2. A vehicle that engages in swerving within a lane and forcefully brakes is assigned a value of 3.

At activity 706, the detection engine 303 determines whether the AD of the target vehicle 105 exceeds a threshold value. The customizable AD system 100 includes a default threshold value. The driver of the ego vehicle 103 is notified of the AD of the target vehicle if the AD value of the target vehicle 105 exceeds the threshold. For example, if the AD value of target vehicle 105 is 1, and the default threshold value is 2, the driver of the ego vehicle 103 will not be notified of the AD of the target vehicle 105. If the AD value of the target vehicle 105 is 4, and the default threshold value is 2, then the driver of the ego vehicle 103 will be notified of the AD of the target vehicle 105. As explained in FIGS. 8 and 9, the driver of ego vehicle 103 can alter the threshold based on his/her reactions or input to the notification (FIG. 8 discloses a method of adjusting the threshold sensitivity based on the ego vehicle driver's reaction, while FIG. 9 discloses a method of adjusting the threshold sensitivity based on the ego vehicle driver's input). Accordingly, the driver of the ego vehicle can customize the notification to his/her level of preferred sensitivity. For example, a driver of the ego vehicle may not want to be notified of an AD value of the target vehicle of 2, but may want to be notified of an AD value of the target vehicle of 3.

Referring back to FIG. 7, at activity 708, the method 700 includes notifying the driver of the AD of the target vehicle 105 if the detection engine 303 determines that the AD of the target vehicle exceeds the threshold value. Once the customizable AD system 100 determines that the AD exceeds a threshold value, the customizable AD system 100 notifies the driver using one or more notification methods. In one embodiment, the notification methods include the vehicle systems 358 comprising the vehicle audio system 372 and the vehicle dashboard system 376. The notification methods include visual and/or audible methods of informing the driver of the ego vehicle 103 of the AD of the target vehicle 105. In one embodiment, the notification methods include notifying the driver of the ego vehicle 103 via one or more vehicle systems 358 of the ego vehicle 103. For example, in one embodiment, the driver is notified via the vehicle audio system 374 (e.g., instructions played/broadcasted over one or more vehicle speakers), the vehicle display system 380 and/or the vehicle dashboard system 376. In one embodiment, the driver is notified of the AD by a device within the instrument cluster and/or the dashboard GUI. The notification can include visual instructions (e.g., visual directions on how to proceed), and/or auditory instructions (e.g., verbal commands from the customizable AD system 100 to the driver).

Figure 8:
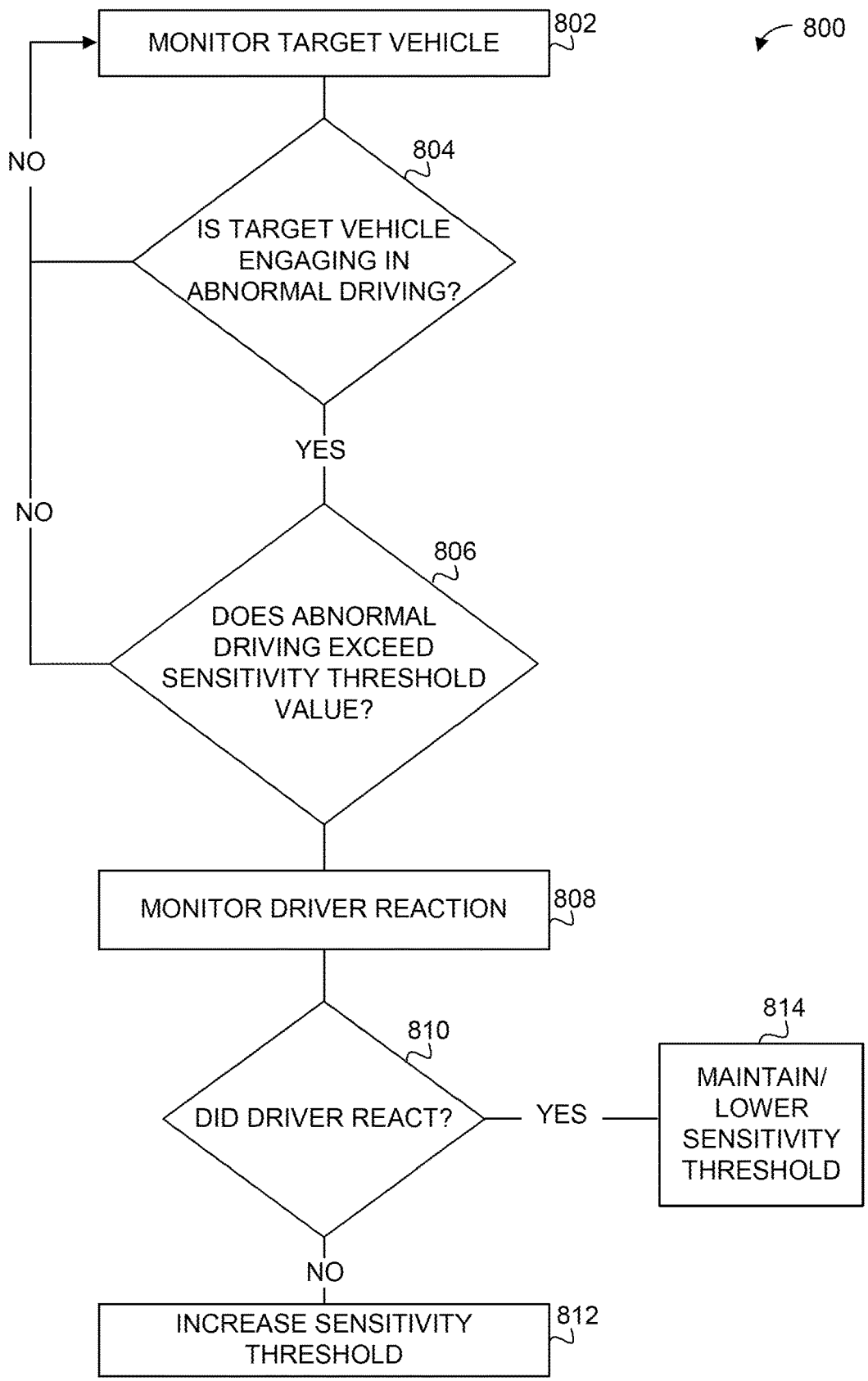
FIG. 8 depicts a method of altering the sensitivity threshold of customizable abnormal driving system, according to one embodiment.

FIG. 8 is an illustration of a method 800 of adjusting the threshold of the customizable AD system 100 based on the driver's reaction, according to one embodiment. Method 800 includes monitoring the target vehicle, determining that the target vehicle is engaging in AD, determining that the AD exceeds a threshold, monitoring the driver reaction, adjusting the threshold based on the driver's reaction.

At activity 802-806 the method 800 includes monitoring the target vehicle and determining whether the target vehicle 105 is engaging in an AD above a threshold sensitivity value according to the methods described in activity 702-706 of FIG. 7.

At activity 808, the method 800 includes monitoring the driver reaction. In one embodiment, the customizable AD system 100 is trained to adjust the threshold value using data comprising driver reactions to the notification. The data is captured by one or more sensors 352 and/or vehicle systems 358. The data can be used as a feedback to train the detection engine 303 of the AD system 100.

At activity 810 the method 800 includes determining whether the driver reacted to the notification of the AD of the target vehicle 105. In one embodiment, the detection engine 303 comprising one or more ML algorithms are configured to determine whether the driver engaged in an observable reaction. The "observable action" includes any action that can be monitored by one or more systems within the vehicle (i.e., data regarding the driver's reaction can be captured by one or more systems within the vehicle). For example, the driver's observable reaction can include engaging in a vehicle maneuver (e.g., the driver depressing the brake to slow down the vehicle, or the driver engaging the turn signal to signal that he/she desires to change lanes) upon notification of the AD of the target vehicle. The observable action can further include the driver engaging in a physical activity within the vehicle that does not directly impact systems of the vehicle at the time of the physical activity. For example, a the driver looking over his/her shoulder. The detection engine is further configured to adjust the threshold AD value of the customizable AD system depending on the driver's observable reactions. Data comprising the driver's reactions, captured by the one or more vehicle sensors 352, is used by the detection engine 303 to alter the threshold of the customizable AD system 100. The detection engine 303 alters the threshold of the customizable AD system 100 based on the driver's observed reaction. The threshold can be increased at activity 814, or maintained/lowered at activity 816.

At activity 812 the method 800 includes increasing the threshold if the driver did not react to the notification. For example, if the determined AD value is above a threshold and the driver of the ego vehicle 103 does not react to the notification (e.g., the driver ignores the notification), then the AD system 100 uses the driver feedback to alter the sensitivity of the AD threshold value. In this example, because the driver ignored the notification, the detection engine 303 would likely increase the threshold, such that if same or similar AD data was captured, the AD system would not notify the driver. Increasing the threshold value decreases the amount of notifications that the driver of the ego vehicle 103 receives, as the AD value necessary to violate/reach the threshold value is much higher.

For example, if the driver fails to engage in an observable reaction upon notification of the AD of the target vehicle having a first AD value, the customizable AD system 100 adjusts the sensitivity threshold value so that future target ADs having a first AD value will not result in a notification (e.g., the first AD value will not be above a threshold notification value). In one embodiment, the driver's reaction is monitored via one or more vehicle sensors 352. The vehicle sensors 352 include in-vehicle sensors 323 configured to capture data comprising driver reactions. The in-vehicle sensors 323 include any sensor capable of determining whether the driver engaged in an observable driving reaction (e.g., a camera sensor, a motion sensor, a thermal sensor, an infrared sensor, a capacitive touch sensor, a weight sensor, a resistance sensor etc.)

At activity 814, the method 800 includes maintaining/lowering the threshold value of the customizable AD system if the driver reacts to the notification, the customizable AD system 100 determines that the threshold value sensitivity is sufficient and therefore does not need to be further adjusted. The detection engine 303 increases the threshold sensitivity by using the driver feedback. For example if the detection engine 303 determines that the driver consistently reaction to notifications, the detection engine 303 can decrease the threshold sensitivity value. Decreasing the threshold sensitivity value increases the amount of notifications that the driver of the ego vehicle 103 receives as smaller (e.g., more finite) AD of the target vehicle 105 results in a notification.

By altering the threshold value, the customizable AD system 100 is able to alter the threshold parameters of the customizable AD system to remove notifications of the AD vehicle behavior that the driver may not desire/find relevant. By altering the threshold value of the customizable AD system to remove notifications that the driver of the ego vehicle 103 may not desire to be notified of, the customizable AD system 100 can improve driver trust thereby ultimately increasing driver safety.

Figure 9:
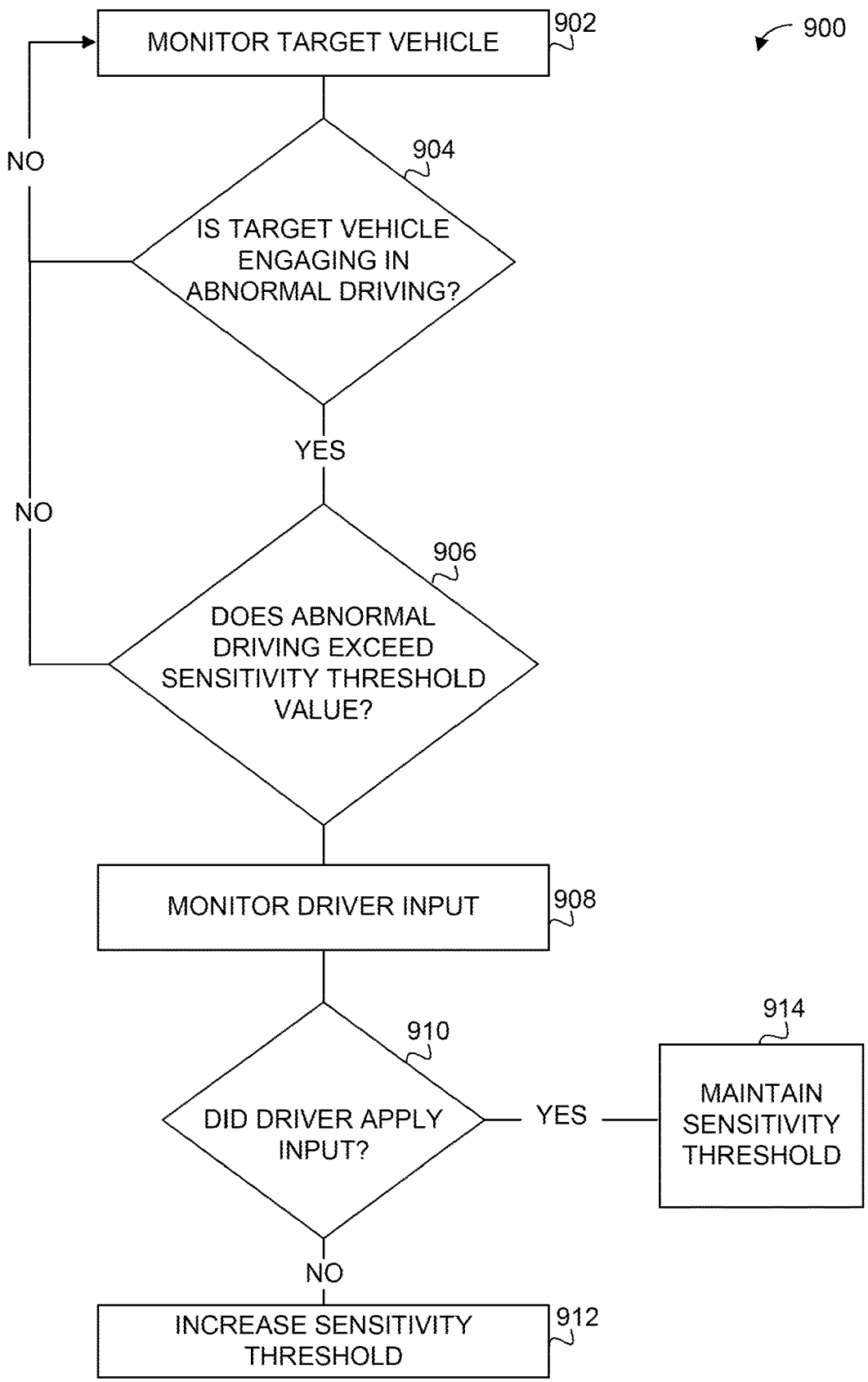
FIG. 9 depicts a method of altering the sensitivity threshold of the customizable abnormal driving system, according to one embodiment.

FIG. 9 is an illustration of a method 900 of manually adjusting the threshold parameters of the customizable AD system 100, according to one embodiment. The method includes, monitoring the target vehicle to determine that the target vehicle is engaging in AD. If the customizable AD system 100 determines that the target vehicle 105 is engaging in an AD above a threshold value, the customizable AD system 100 notifies the driver of the ego vehicle. Here, the threshold value is adjusted by an input of the driver of the ego vehicle 103. In one embodiment, an ego vehicle driver "input" includes manually altering the threshold s value using one or more in-vehicle controls and/or one or more devices to increase or decrease the threshold parameters of the customizable AD system 100. The devices include any device that is capable of communicating with the customizable AD circuit 310 (e.g., a hand-held device, one or more in-vehicle controls).

At activity 902-906 the method 900 includes monitoring the target vehicle and determining whether the target vehicle 105 is engaging in an AD above a threshold sensitivity value according to the methods described in activity 702-706 of FIG. 7.

At activity 908, the method 900 includes monitoring driver input. In one embodiment, the threshold value is manually altered by the driver using one or more in-vehicle controls to increase or decrease the threshold parameters of the customizable AD system 100. The "input" can include a manual input via one or more manual methods. For example, the driver can apply a manual input using a control knob, a touch screen, a switch, etc., located within the vehicle. In one embodiment, the driver can "input" the data to train the detection engine 303 using a user device such as a smartphone or personal computer. As explained at activity 910-914, the ego driver's input is used to adjust the threshold value depending on the driver's notification preferences. For example, the driver may not want to be notified of minor target vehicle AD (e.g., a low AD value). Accordingly, the driver of the ego vehicle 103 can alter the default sensitivity threshold using the input. By altering the threshold value, the customizable AD system is trained to adjust notification of target vehicle AD based on the new threshold value. Future target vehicle AD with values beneath the threshold value will not trigger a notification. Future target vehicle AD above the threshold values will trigger an customizable AD system notification of target vehicle AD.

At activity 910 the method 900 includes determining whether the driver provided an input after notification of the AD of the target vehicle. The detection engine 303 is configured to adjust the threshold value of the customizable AD system depending on the driver's input. Data comprising the driver's input, captured by the one or more vehicle sensors 352, is used by the detection engine 303 to alter the threshold parameters of the customizable AD system 100. The detection engine 303 alters the threshold parameters of the customizable AD system 100 based on the driver's input. The threshold parameters can be increased at activity 914, or maintained/lowered at activity 916.

At activity 912-916 the method 900 includes altering the threshold sensitivity value according to the methods described in activity 812-816 of FIG. 8.

Figure 10:
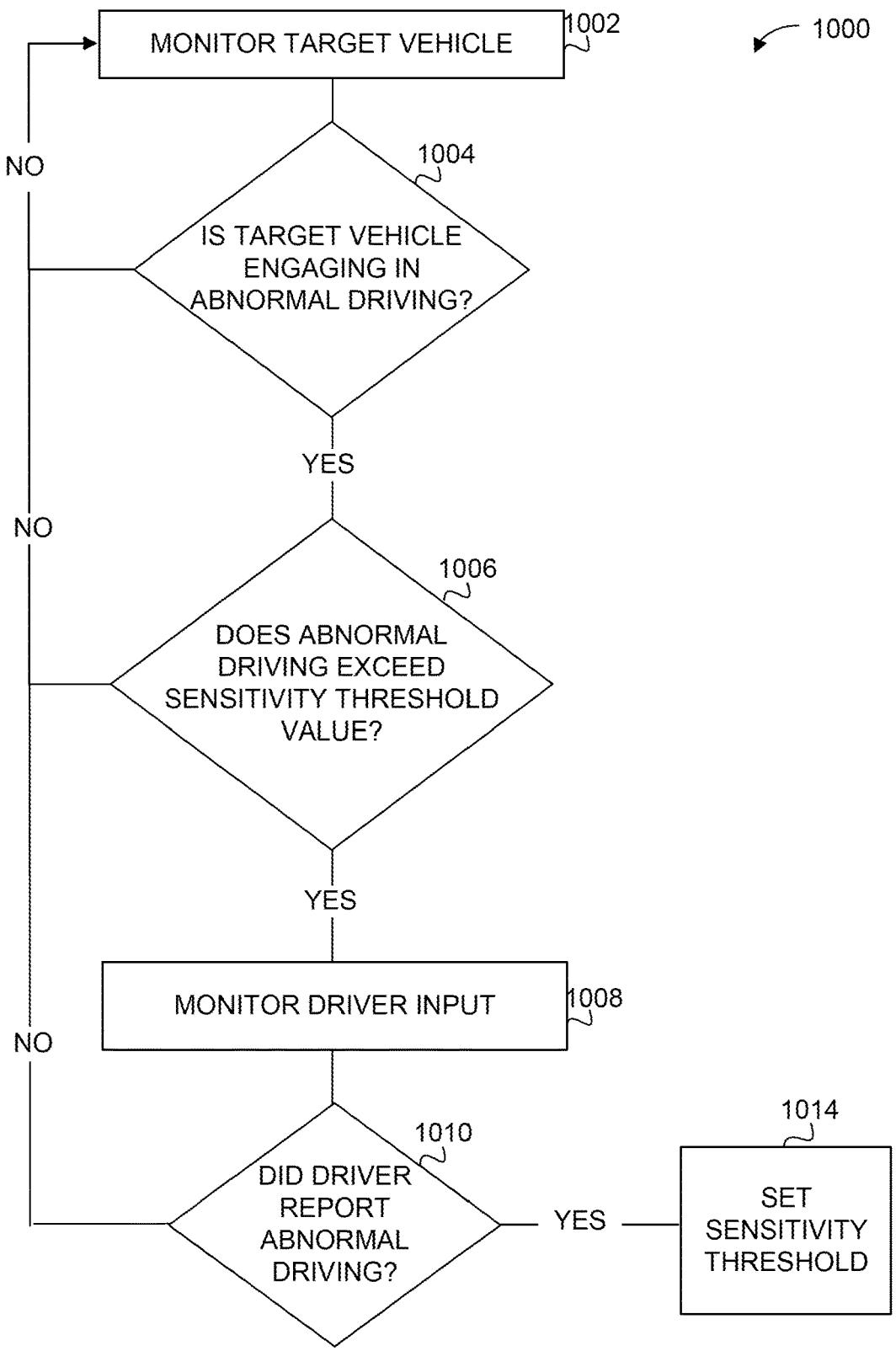
FIG. 10 is an illustration of a method of manually setting the sensitivity threshold of the customizable AD system, according to one embodiment.

FIG. 10 is an illustration of a method 1000 of manually setting the sensitivity threshold of the customizable AD system 100, according to one embodiment. At activity 1002-1008 the method 1000 includes monitoring the target vehicle, determining that the target vehicle is engaging in abnormal driving, determining that the AD of the target vehicle exceeds the threshold parameters, and monitoring the driver input according to the methods described in activity 802-808 of FIG. 8.

Figure 11:
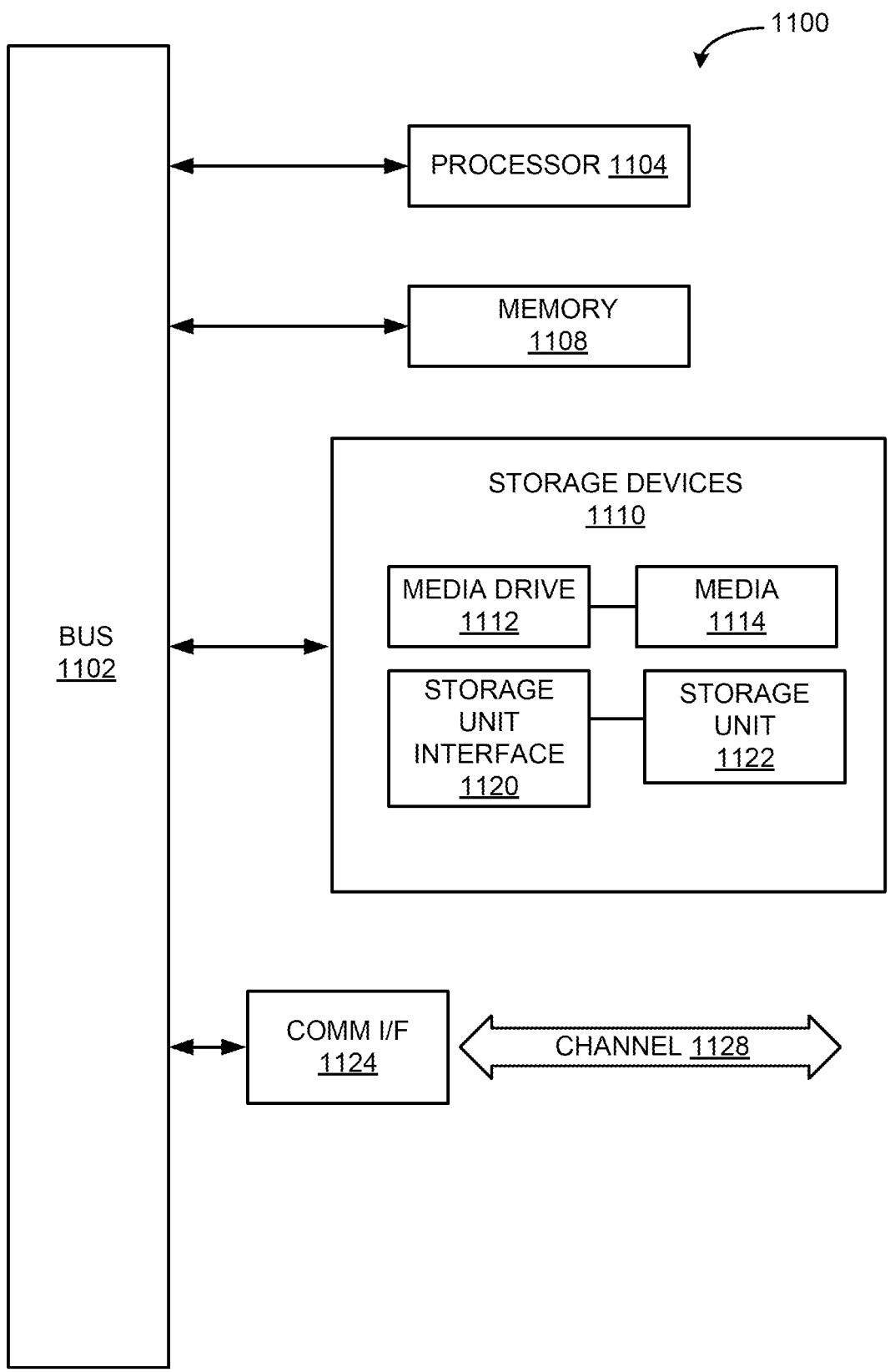
FIG. 11 is an example computing component that may be used to implement various features of embodiments described in the present disclosure.

At activity 1010 the AD system 100 determines whether the driver of the ego vehicle reported abnormal driving. In one embodiment, the detection engine 303 uses driver input to set the sensitivity threshold value of the customizable AD system 100 and/or define an AD of the target vehicle. The "input" can include a manual input via one or more manual methods. For example, the driver can apply a manual input using a control knob, a touch screen, a switch, etc., located within the vehicle. In one embodiment, the driver can "input" data to set the threshold value of the customizable AD system 100 using a user device such as a smartphone or personal computer. In one embodiment, the driver of the ego vehicle can use the input to define an AD of the target vehicle, that may not have been determined by the customizable AD system 100. For example, the customizable AD system 100 may have captures data regarding a target vehicle, but did determine that the target vehicle 105 was engaging in AD. The driver of the ego vehicle 103 can use one or more methods of input to inform/program the customizable AD system 100 to recognize data comprising future target vehicle behavior as AD. Using the driver input, the driver of the ego vehicle 103 can set the threshold parameters of activity 1012.

Where components are implemented in whole or in part using software, these software elements can be implemented to operate with a computing or processing component capable of carrying out the functionality described with respect thereto. One such example computing component is shown in FIG. 11. Various embodiments are described in terms of this example computing component 1100. After reading this description, it will become apparent to a person skilled in the relevant art how to implement the application using other computing components or architectures.

Referring now to FIG. 11, computing component 1100 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1100 might also represent computing capabilities embedded within or otherwise available to a given device. For example, a computing component might be found in other electronic devices such as, for example, portable computing devices, and other electronic devices that might include some form of processing capability.

Computing component 1100 might include, for example, one or more processors, controllers, control components, or other processing devices. Processor 1104 might be implemented using a general-purpose or special-purpose processing engine such as, for example, a microprocessor, controller, or other control logic. Processor 1104 may be connected to a bus 1102. However, any communication medium can be used to facilitate interaction with other components of computing component 1100 or to communicate externally.

Computing component 1100 might also include one or more memory components, simply referred to herein as main memory 1108. For example, random access memory (RAM) or other dynamic memory, might be used for storing information and instructions to be executed by processor 1104. Main memory 1108 might also be used for storing temporary variables or other intermediate information during execution of instructions to be executed by processor 1104. Computing component 1100 might likewise include a read only memory ("ROM") or other static storage device coupled to bus 1102 for storing static information and instructions for processor 1104.

The computing component 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a solid-state drive, a magnetic tape drive, an optical drive, a compact disc (CD) or digital video disc (DVD) drive (R or RW), or other removable or fixed media drive might be provided. Storage media 1114 might include, for example, a hard disk, an integrated circuit assembly, magnetic tape, cartridge, optical disk, a CD or DVD. Storage media 1114 may be any other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into computing component 1100. Such instrumentalities might include, for example, a fixed or removable storage unit 1122 and the storage unit interface 1120. Examples of such storage units 1122 and storage unit interfaces 1120 can include a program cartridge and cartridge interface, a removable memory (for example, a flash memory or other removable memory component) and memory slot. Other examples may include a PCMCIA slot and card, and other fixed or removable storage units 1122 and storage unit interfaces 1120 that allow software and data to be transferred from storage unit 1122 to computing component 1100.

Computing component 1100 might also include a communications interface 1124. Communications interface 1124 might be used to allow software and data to be transferred between computing component 1100 and external devices. Examples of communications interface 1124 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1124 may be carried on signals, which can be electronic, electromagnetic (which includes optical) or other signals capable of being exchanged by a given communications interface 1124. These signals might be provided to communications interface 1124 via a channel 1128. Channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1108, storage unit interface 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1100 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
a memory storing machine-executable instructions; and
a processor configured to access the memory and execute the machine-executable instructions to:
determine a default threshold value of an abnormal driving notification system configured to notify a driver of an ego vehicle of a target vehicle engaging in abnormal driving within a proximity of the ego vehicle;
determine that the target vehicle is engaging in abnormal driving;
determine that the abnormal driving exceeds the default threshold value of an abnormal driving notification system;
notify the driver of the ego vehicle that the target vehicle is engaging in abnormal driving;
monitor the driver of the ego vehicle to determine a reaction of the driver of the ego vehicle upon notification of the target vehicle engaging in abnormal driving; and
alter the default threshold value of the abnormal driving notification system upon the driver reacting to the notification to generate a threshold value individually associated with the driver of the ego vehicle, and only if the driver reacted to abnormal driving of the target vehicle at a first time period and at a second time period, and the target vehicle engaged in abnormal driving at the first time period and the second time period.

2. The system of claim 1, wherein altering the default threshold value includes increasing the threshold value upon the abnormal driving notification system determining that the driver did not react to the abnormal driving of the target vehicle.

3. The system of claim 1, wherein altering the default threshold value includes decreasing the threshold value upon the abnormal driving notification system determining that the driver reacted to the abnormal driving of the target vehicle.

4. The system of claim 1, further comprising instructions to:
monitor the driver of the ego vehicle to determine the reaction of the driver of the ego vehicle during the first time period and determine the reaction of the driver during the second time period.

5. The system of claim 4, further comprising instructions to:
store an amount of abnormal driving of the target vehicle at the first time period and the amount of abnormal driving of the target vehicle at the second time period.

6. The system of claim 1, wherein the target vehicle continuously engaged in abnormal driving throughout the first time period and the second time period.

7. The system of claim 6, wherein the target vehicle engaged in a first amount of abnormal driving during the first time period and a second amount of abnormal driving during the second time period.

8. The system of claim 7, wherein the first amount of abnormal driving is above the threshold value and the second amount of abnormal driving is above the threshold value.

9. The system of claim 1, wherein the threshold value is decreased upon the abnormal driving notification system determining that the driver reacted to the abnormal driving of the target vehicle without a notification.

10. A system comprising:
a memory storing machine-executable instructions; and
a processor configured to access the memory and execute the machine-executable instructions to:
determine that a target vehicle is engaging in abnormal driving;
determine that the abnormal driving exceeds a threshold value of an abnormal driving notification system;
notify a driver of an ego vehicle of the target vehicle engaging in an abnormal driving;
monitor the driver of the ego vehicle to determine that the driver applied an input; and
alter the threshold value of the abnormal driving notification system only if:
upon the driver reacting to the notification to generate a threshold value individually associated with the driver of the ego vehicle, and only if the driver reacted to abnormal driving of the target vehicle at a first time period and at a second time period, and the target vehicle engaged in abnormal driving at the first time period and the second time period.

11. The system of claim 10, wherein altering the threshold value includes increasing the threshold value upon the abnormal driving notification system determining that the driver did not apply an input upon notification of the abnormal driving of the target vehicle.

12. The system of claim 10, further comprising instructions to maintain the threshold value of the abnormal driving notification system upon the abnormal driving notification system determining that the driver did apply an input upon notification of the abnormal driving of the target vehicle.

13. The system of claim 10, further comprising instructions to:
  continuously monitor an input of the ego vehicle driver throughout operation of the ego vehicle; and
  determine that the abnormal driving does not exceed a threshold value of an abnormal driving notification system.

14. The system of claim 13, wherein the threshold value is decreased upon the abnormal driving notification system determining that the driver applied an input upon without a notification of an abnormal driving of the target vehicle.

15. A system comprising:
  a memory storing machine-executable instructions; and
  a processor configured to access the memory and execute the machine-executable instructions to:
    determine that a target vehicle is engaging in an abnormal driving;
    determine that the abnormal driving exceeds a threshold parameter of an abnormal driving notification system;
    transmit a notification throughout an ego vehicle;
    monitor the ego vehicle;
    alter the threshold parameter based at least one of: (i) a ego vehicle action and (ii) a driver action, and only if a driver of the ego vehicle reacted to abnormal driving of the target vehicle at a first time period and at a second time period, and the target vehicle engaged in abnormal driving at the first time period and the second time period.

16. The system of claim 1, wherein altering the threshold parameter includes increasing a threshold value upon the abnormal driving notification system determining that a driver of the ego vehicle did not react to the abnormal driving of the target vehicle.

17. The system of claim 1, wherein altering the threshold parameter includes decreasing a threshold value upon the abnormal driving notification system determining that the driver reacted to the abnormal driving of the target vehicle.

18. The system of claim 1, further comprising instructions to:
  determine that the target vehicle is engaging in abnormal driving at a first time period and a second time period; and
  monitor the driver of the ego vehicle to determine the reaction of the driver of the ego vehicle during the first time period and determine the reaction of the driver during the second time period.

* * * * *